(12) United States Patent
Arima

(10) Patent No.: US 6,882,455 B2
(45) Date of Patent: Apr. 19, 2005

(54) MOVABLE STRUCTURE, AND DEFLECTION MIRROR ELEMENT, OPTICAL SWITCH ELEMENT AND SHAPE VARIABLE MIRROR INCLUDING THE MOVABLE STRUCTURE

(75) Inventor: Michitsugu Arima, Kamiina-gun (JP)

(73) Assignee: Olympus Corporation, Tokyo (JP)

(*) Notice: Subject to any disclaimer, the term of this patent is extended or adjusted under 35 U.S.C. 154(b) by 278 days.

(21) Appl. No.: 10/247,465

(22) Filed: Sep. 19, 2002

(65) Prior Publication Data

US 2003/0053186 A1 Mar. 20, 2003

(30) Foreign Application Priority Data

Sep. 19, 2001 (JP) .......................................... 2001-285571
Mar. 7, 2002 (JP) .......................................... 2002-062457

(51) Int. Cl.[7] .............................................. G02B 26/08
(52) U.S. Cl. ........................................ 359/224; 359/871
(58) Field of Search ................................ 359/223, 224, 359/226, 871, 225, 872

(56) References Cited

U.S. PATENT DOCUMENTS 5,228,966 A * 7/1993 Murata .................... 204/224 R
6,300,619 B1  10/2001 Aksyuk et al.

FOREIGN PATENT DOCUMENTS

| EP | 1 054 285 A1 | 11/2000 |
| JP | 7-49460 | 2/1995 |
| JP | 2000-330067 | 11/2000 |

* cited by examiner

Primary Examiner—Euncha P. Cherry
(74) Attorney, Agent, or Firm—Scully, Scott Murphy & Presser

(57) ABSTRACT

There is disclosed a movable structure, which includes a movable body, at least a pair of elastic members extending from the movable body to both sides, and a support supporting the movable body through the elastic members, each elastic member having a mesh structure, and the support and the movable body being connected to each other through the elastic members.

15 Claims, 14 Drawing Sheets

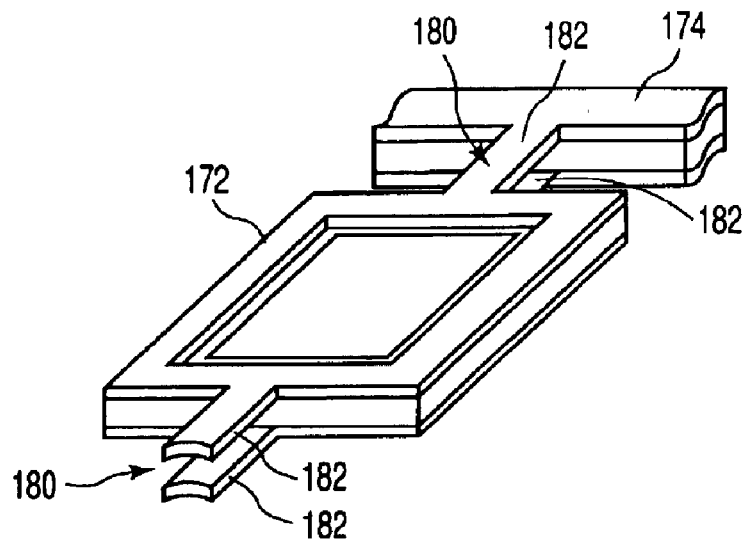
F I G. 5
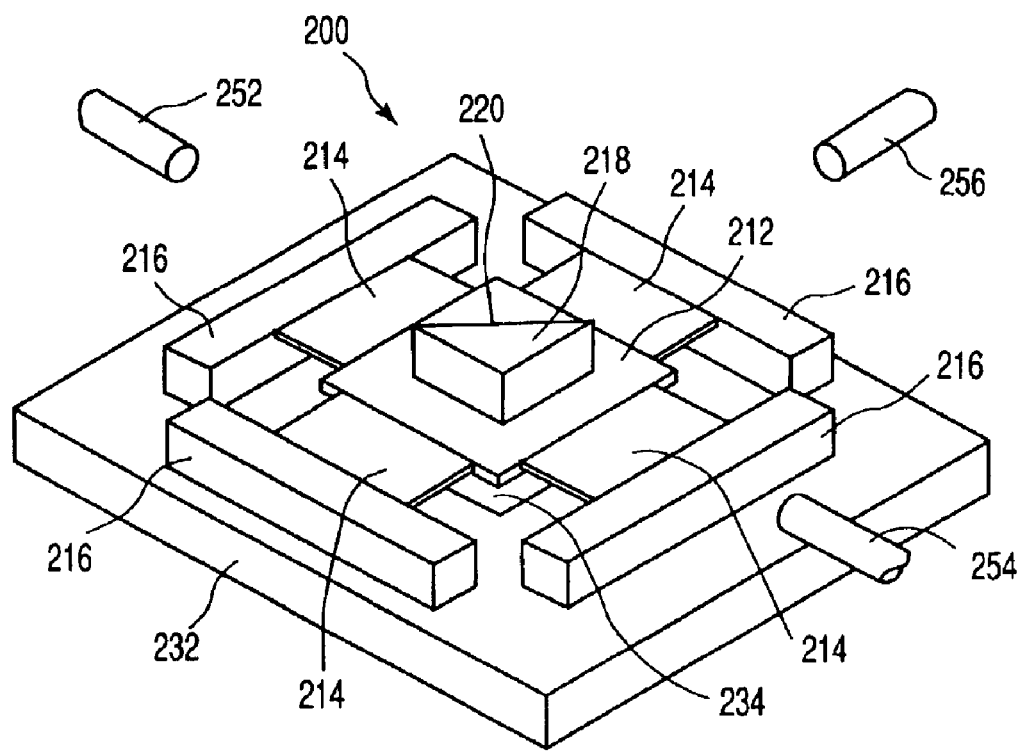
F I G. 6

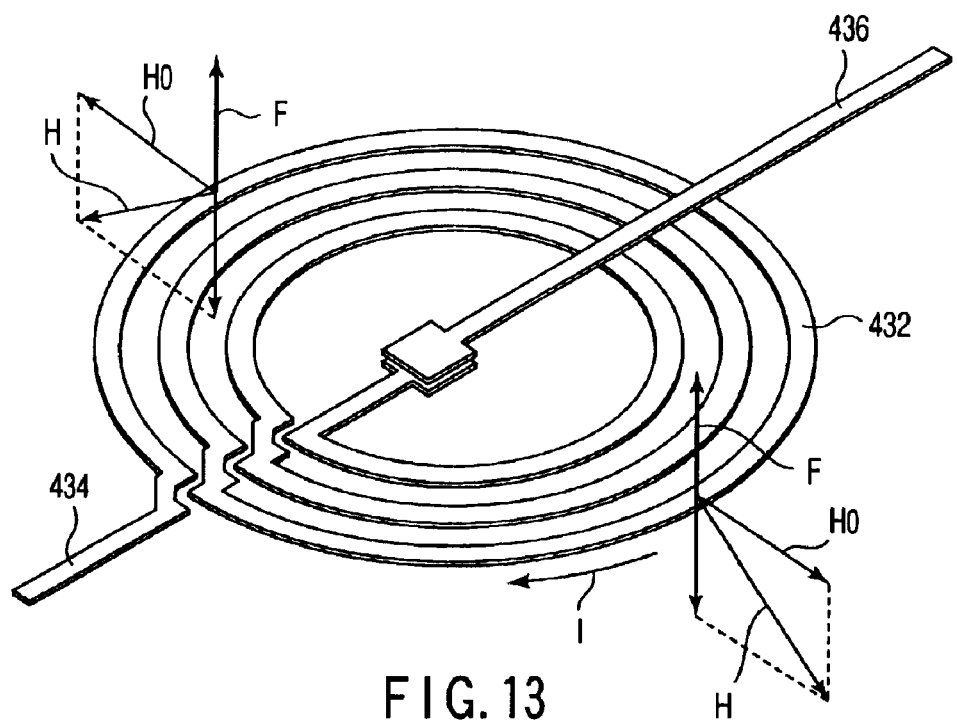
F I G. 13
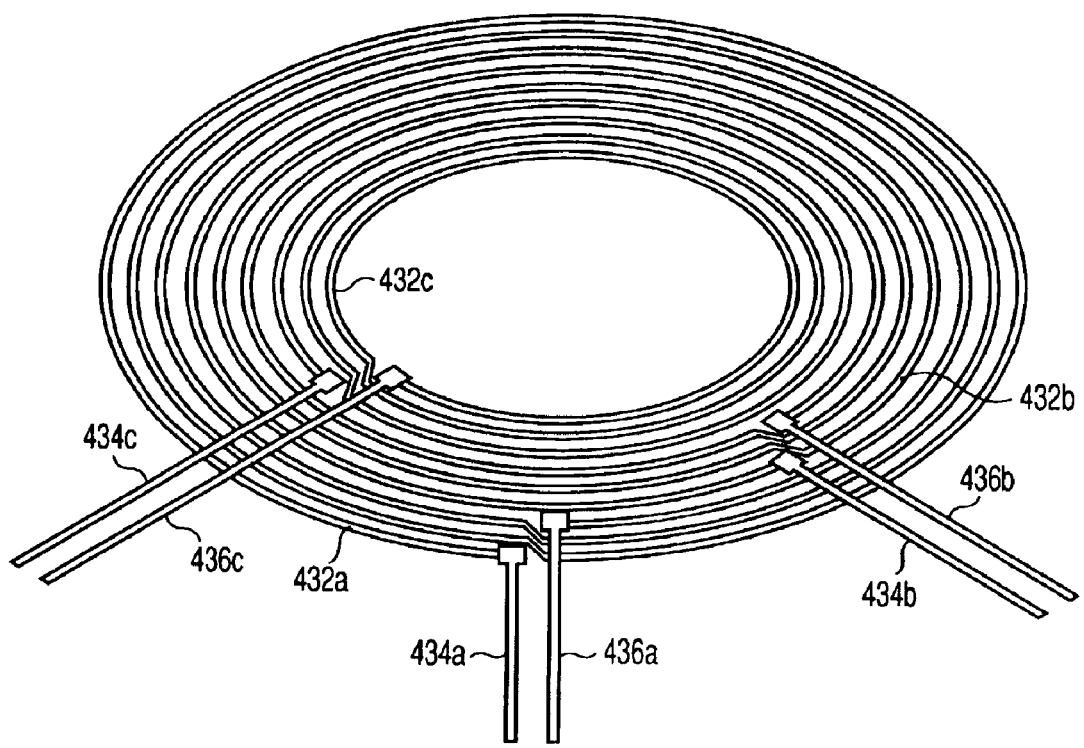
F I G. 14

MOVABLE STRUCTURE, AND DEFLECTION MIRROR ELEMENT, OPTICAL SWITCH ELEMENT AND SHAPE VARIABLE MIRROR INCLUDING THE MOVABLE STRUCTURE

CROSS-REFERENCE TO RELATED APPLICATIONS

This application is based upon and claims the benefit of priority from the prior Japanese Patent Applications No. 2001-285571, filed Sep. 19, 2001; and No. 2002-62457, filed Mar. 7, 2002, the entire contents of both of which are incorporated herein by reference.

BACKGROUND OF THE INVENTION

1. Field of the Invention

The present invention relates to a movable structure having a movable body allowed to move with respect to a support, and more particularly to a movable structure manufactured by a micromachine manufacturing process or the like.

2. Description of the Related Art

In a micromachine element, a movable structure having a movable body supported by a pair of springs is often used. FIG. 22 shows this movable structure. As shown in FIG. 22, the movable structure 700 comprises a movable body 712, supports 716, and springs each of which connects the movable body 712 and the support 716. The movable body 712 is allowed to move with respect to the supports 716 by deformation of the springs 714.

In this movable structure 700, the movable body 712 is supported by a pair of springs which extend therefrom. Therefore, the springs 714 must be at least partially deformed. That is, a part or all of each spring 714 must be deformed. Deformation of the spring 714 generates the locally excessive stress therein at times. Generation of the excessive stress lowers the drive efficiency of the micromachine element or increases the non-linearity of the drive characteristic of the micromachine element.

Generation of the excessive stress can be avoided by lowering Young's modulus of the spring 714, e.g., slenderizing and thinning the spring 714. However, such a slender and thin spring disadvantageously considerably lowers the impact resistance of the micromachine element.

In order to avoid generation of the excessive stress in the spring while maintaining the impact resistance of the micromachine element, there is known the movable structure using a flexuous structure spring. FIG. 23 shows a deflection mirror element using such a movable structure. As shown in FIG. 23, the deflection mirror element 800 comprises a movable structure and a substrate 832 supporting the movable structure. The movable structure comprises an inner movable plate 812 having a reflection surface, an outer movable plate 816 surrounding the inner movable plate 812, a pair of flexuous structure springs 814 connecting the inner movable plate 812 and the outer movable plate 816, a pair of supports 820 positioned outside the outer movable plate 816, and a pair of flexuous structure springs 818 connecting the outer movable plate 816 and the support 820.

The supports 820 are fixed to the substrate 832, and the substrate 832 has a pair of inner drive electrodes 834 opposed to the inner movable plate 812 and a pair of outer drive electrodes 836 opposed to the outer movable plate 816.

In this deflection mirror element, when an appropriate potential difference is given between the inner movable plate 812 and each drive electrode 834, the electrostatic attraction is generated therebetween. The inner movable plate 812 is turned about an axis $L_1$ by this electrostatic attraction. Further, the outer movable plate 816 is turned about an axis $L_2$ together with the inner movable plate 812 by the electrostatic attraction which is generated between the outer movable plate 816 and each drive electrode 836 by giving an appropriate potential difference therebetween. As a result, the direction of the inner movable plate 812 can be arbitrarily adjusted.

Rotation of the movable plate 812 gives the tensile force to the flexuous structure springs 814 and 818 along axes thereof. With respect to this tensile force, the flexuous structure springs 814 and 818 demonstrate flexural deformation. Therefore, the stress generated inside the flexuous structure springs 814 and 818 is reduced. In other words, the flexuous structure springs 814 and 818 ease the stress generated therein. This realizes improvement in the drive efficiency or reduction in the non-linearity of the drive characteristic.

In the micromachine element (deflection mirror element) having such a flexuous structure springs, however, when an impact shock is given to the micromachine element, abnormal deformation may be possibly generated in the flexuous structure springs. For example, as shown in FIG. 24, a part of the flexuous structure spring 850 may be possibly attached and can not be removed (sticking may occurs). Alternatively, as shown in FIG. 25, the flexuous structure spring 850 may move onto the support 852 corresponding to the support or the movable body and can not return to the original position.

BRIEF SUMMARY OF THE INVENTION

An aspect of the present invention is directed to a movable structure for a micromachine element, the movable structure comprising a movable body, at least a pair of elastic members extending from the movable body to both sides, and a support supporting the movable body through the elastic members, each of the elastic members having a mesh structure, and the support and the movable body being connected to each other through the elastic members.

Another aspect of the present invention is directed to a deflection mirror element comprising the aforementioned movable structure, a reflection surface, which is formed on the movable body, reflecting a light beam, and driver changing a direction of the movable plate, such that a direction of the light beam reflected by the reflection surface is varied in accordance with a change in direction of the movable plate.

Still another aspect of the present invention is directed to a optical switch element comprising the aforementioned movable structure, a mirror, which is fixed to the movable body, reflecting a light beam, and driver moving the movable body, such that a direction of the light beam is switched in response to the insertion and withdrawal of the mirror with respect to an optical path of the light beam by movement of the movable body.

Yet another aspect of the present invention is directed to a shape variable mirror comprising the aforementioned movable structure, a reflection surface formed on the movable body, and driver deforming the movable body, such that a shape of the reflection surface is changed by deformation of the movable body.

According to the movable structure of the present invention, since the elastic member has the mesh structure, the stress generated inside the elastic member is eased, and abnormal deformation of the elastic member is prevented from being generated. As a result, there are provided a movable structure for a micromachine element, the movable structure avoiding deterioration in the impact resistance of the micromachine element such as generation of abnormal deformation of the spring, while achieving improvement in the drive efficiency and reduction in the non-linearity of the drive characteristic, and a micromachine element, such as a deflection mirror element, an optical switch element and a shape variable mirror, including the movable structure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 shows a special movable structure to which the present invention can be applied, the movable structure including a pair of torsion spring structures supporting the movable plate, each torsion spring structure being constituted by two torsion springs;

FIG. 6 shows an optical switch element having the movable structure according to the present invention as a second embodiment of the present invention;

FIG. 13 shows a flat coil of the mirror structure depicted in FIG. 10 in the enlarged manner;

FIG. 14 is a perspective view of a flat coil provided instead of the flat coil illustrated in FIG. 10 in a preferred modification of the shape variable mirror according to the fourth embodiment;

DETAILED DESCRIPTION OF THE INVENTION

Preferred embodiments according to the present invention will now be described hereinafter with reference to the accompanying drawings.

First Embodiment

Figure 1:
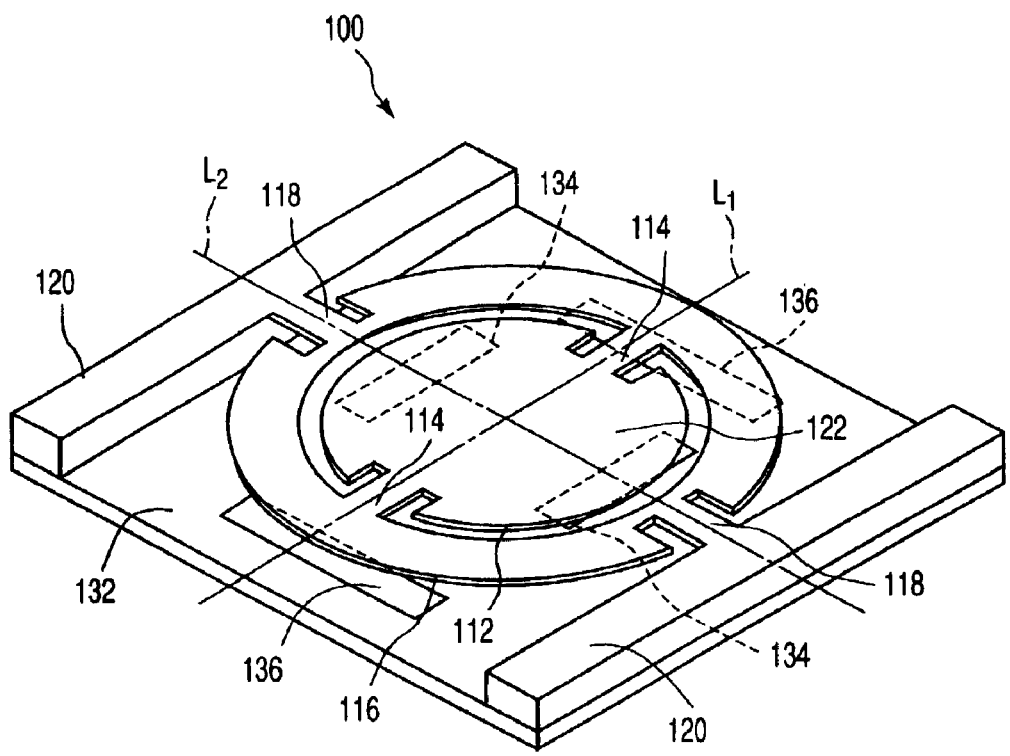
FIG. 1 shows an optical deflection element having a movable structure according to the present invention as a first embodiment of the present invention.

As a first embodiment of the present invention, FIG. 1 shows an optical deflection element having a movable structure according to the present invention.

The optical deflection element comprises a movable structure and a substrate 132 supporting the movable structure. The movable structure comprises an inner movable plate 112, an outer movable plate 116 corresponding the inner movable plate 112, a pair of torsion springs 114 connecting the inner movable plate 112 and the outer movable plate 116, a pair of supports 120 positioned outside the outer movable plate 116, and a pair of torsion springs 118 connecting the outer movable plate 116 and the supports 120.

Figure 2:
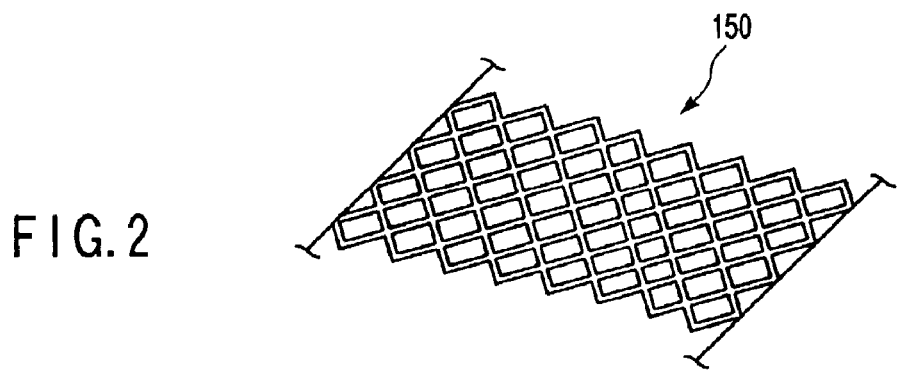
FIG. 2 shows a torsion spring entirely constituted by a mesh structure as an example of a torsion spring of the movable structure illustrated in FIG. 1.
Figure 3:
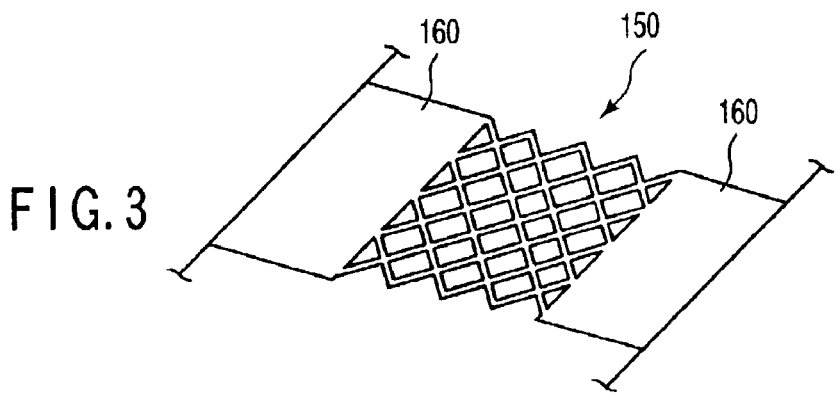
FIG. 3 shows a torsion spring partially having a mesh structure as another example of the torsion spring of the movable structure depicted in FIG. 1.

Both the inner torsion spring 114 and the outer torsion spring 118 at least partially have the mesh structure. For example, as shown in FIG. 2, the inner torsion spring 114 and the outer torsion spring 118 are entirely constituted by the mesh structure 150. Alternatively, as shown in FIG. 3, the inner torsion spring 114 and the outer torsion spring 118 partially have the mesh structure 150. That is, the inner torsion spring 114 and the outer torsion spring 118 have the mesh structure 150 and a platy portion 160.

As shown in FIG. 1, the inner torsion spring 114 extends along an axis $L_1$, the outer torsion spring 118 extends along an axis $L_2$, and the axis $L_1$ and the axis $L_2$ are orthogonal to each other. The inner movable plate 112 is allowed to turn about the axis $L_1$ with respect to the outer movable plate 116 by torsion deformation of the torsion springs 114. Furthermore, the outer movable plate 116 is allowed to turn about the axis $L_2$ with respect to the supports 120 together with the inner movable plate 112 by torsion deformation of the torsion springs 118.

Therefore, the inner movable plate 112 is allowed to face an arbitrary direction with respect to the supports 120 within its movable range. The inner movable plate 112 has a reflection surface 122 for reflecting light on its front side (surface seen in FIG. 1). An incident light beam upon the reflection surface of the inner movable plate 112 is reflected to a direction according to the direction of the inner movable plate 112.

The supports 120 are fixed to the substrate 132. The substrate 132 has a pair of inner drive electrodes 134 opposed to the inner movable plate 112, and a pair of outer drive electrodes 136 opposed to the outer movable plate 116. The inner drive electrodes 134 are positioned on the both sides of the axis $L_1$ along which the inner torsion spring 114 extends, and the outer drive electrodes 136 are positioned on the both sides of the axis $L_2$ along which the outer torsion spring extends.

The inner movable plate 112 is turned about the axis $L_1$ with respect to the supports 120 by giving an appropriate potential difference between the inner movable plate 112 and the inner drive electrodes 134. Similarly, the outer movable plate 116 is turned about the axis $L_2$ with respect to the supports 120 by giving an appropriate potential difference between the outer movable plate 116 and the outer drive electrodes 136.

For example, the inner movable plate 112 is inclined by a fixed angle by maintaining the inner movable plate 112 to a ground potential and applying a fixed voltage to one of the inner drive electrodes 134. The inclination of the inner movable plate 112 can be adjusted by changing the degree of the fixed voltage applied to the inner drive electrode 134. Similarly, the outer movable plate 116 can be likewise inclined by a fixed angle by maintaining the outer movable plate 116 to the ground potential and applying a fixed voltage to one of the outer drive electrodes 136. The inclination of the outer movable plate 116 can be adjusted by changing the degree of the fixed voltage applied to the outer drive electrode 136.

As a result, the inner movable plate 112 can face an arbitrary direction with respect to the supports 120 within its movable range. Consequently, the direction of the light beam reflected by the inner movable plate 112 can be adjusted in accordance with a direction of the inner movable plate 112.

Alternatively, the inner movable plate 112 can be vibrated by maintaining the inner movable plate 112 to the ground potential and applying an alternating voltage between the inner drive electrodes 134. Its deflection angle and frequency can be respectively adjusted by changing the amplitude and the frequency of the alternating voltage to be applied to the outer drive electrode 134. Similarly, the outer movable plate 116 can be likewise vibrated by maintaining the outer movable plate 116 to the ground potential and applying the alternating voltage between the outer drive electrodes 136. Its deflection angle and frequency can be respectively adjusted by changing the amplitude and the frequency of the alternating voltage to be applied to the outer drive electrode.

As a result, the inner movable plate 112 can be two-dimensionally vibrated with respect to the supports 120 within its movable range. That is, the inner movable plate 112 can be independently vibrated around the axis $L_1$ and the axis $L_2$ with an arbitrary deflection angle and an arbitrary frequency. As a result, the light beam reflected by the inner movable plate 112 can be two-dimensionally scanned in accordance with the vibration of the inner movable plate 112.

As described above, the inner torsion spring 114 and the outer torsion spring 118 has the mesh structure 150. As shown in FIGS. 2 and 3, the mesh structure 150 comprises many rectangular or rhombic element structures 152. As typically shown in FIG. 4, each element structure 152 comprises four elastic members 154 connected to each other in the form of a rectangular.

Figure 4:
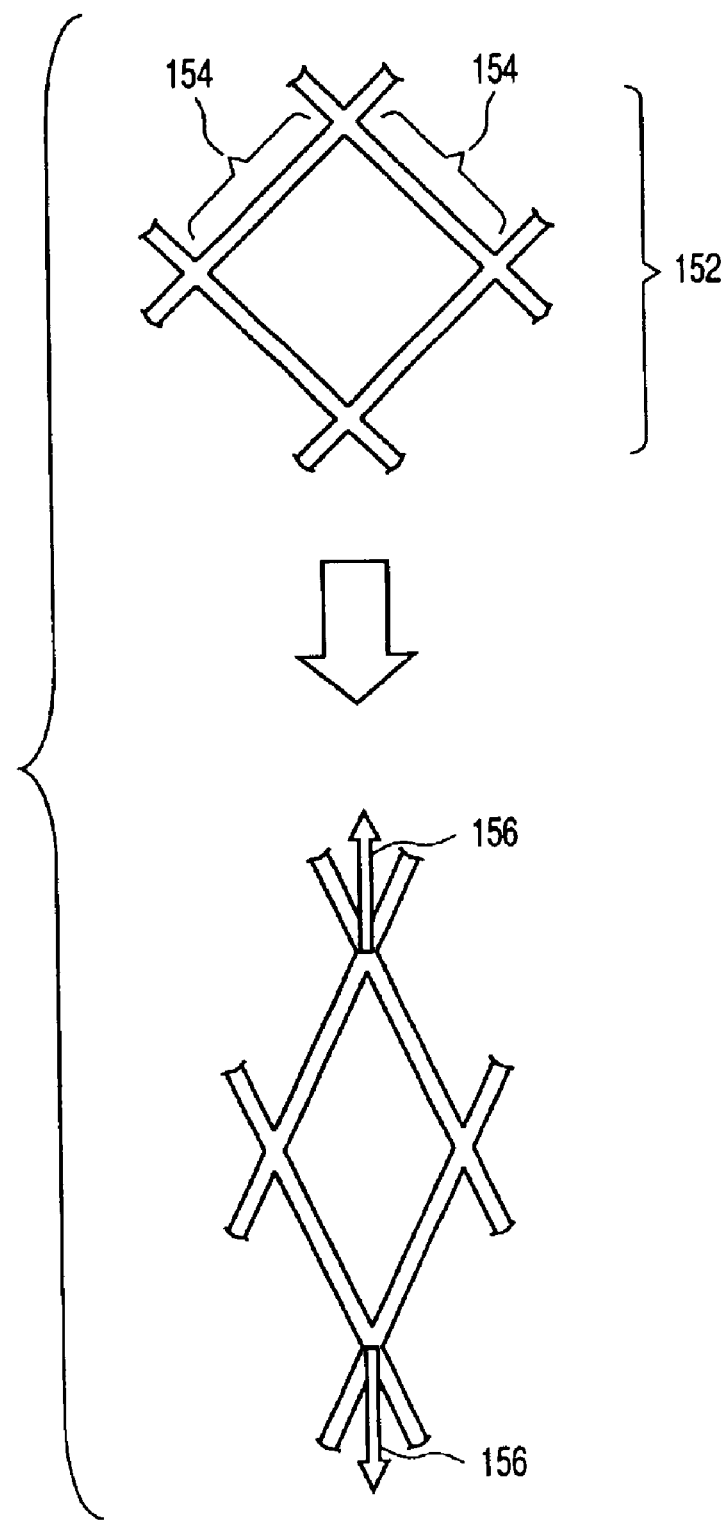
FIG. 4 typically shows the state of deformation of an element structure constituting the mesh structure, which is generated with respect to a tensile force received by the torsion spring.

The torsion springs 114 and 118 receive the tensile force along the axes $L_1$ and $L_2$ by rotation of the movable plates 112 and 116 as indicated by arrows 156 in FIG. 4. The element structures 152 constituting the mesh structure 150 deform with their shape, namely, the rectangular or rhombic shape being extended in the axial direction by the tensile force. The deformation is based on the flexural deformation by which the angles of the elastic members 154 vary in the connection portion of the four elastic members 154 3constituting the element structures 152. Therefore, the stress generated in the torsion springs 114 and 118 is suppressed.

Since the element structures 152 of the mesh structure 150 are not separated from each other, sticking of the element structures 152 of the mesh structure 150, and movement of the element structures 152 of the mesh structure 150 onto the movable plate or the support does not occur even when an impact shock is given to the optical deflection element. That is, abnormal deformation of the torsion springs 114 and 118 is not generated.

Therefore, in the optical deflection element according to this embodiment, improvement in the drive efficiency and reduction in the non-linearity of the drive characteristic are achieved while maintaining the impact resistance.

This embodiment can be modified in many ways without departing from the scope of the present invention.

Although the element structure 152 of the mesh structure of the torsion springs 114 and 118 has the rectangular or rhombic shape in this embodiment, the present invention is not restricted, and it may have any other arbitrary shape such as other polygons, a circle or an ellipse. The mesh structure is composed of one type of element structure in this embodiment, but it may include kinds of element structure having different dimensions or shapes.

As a material of the torsion spring, it is possible to apply any kind of elastic material, for example, a semiconductor material such as silicon or silicon carbide, an organic insulating material such as polyimide resin, silicon resin, fluorocarbon resin or parylene, an inorganic insulating material such as silicon oxide or silicon nitride, or a metallic material such as aluminium or phosphor bronze. When the torsion springs 114 and 118 are formed of a material having the insulation property, wirings for electrical connection to the movable plates 112 and 116 may be formed on the surface or inside the torsion springs 114 and 118.

In this embodiment, although both the inner torsion spring 114 and the outer torsion spring 118 have the mesh structure, only one torsion spring, e.g., the inner torsion spring 114 may have the mesh structure.

Jpn. Pat. Appln. KOKAI Publication No. 2000-330067 discloses a movable structure having a pair of torsion spring structures supporting a movable plate, each torsion spring structure being constituted by two torsion springs. The present invention may be applied to the torsion spring of such a torsion spring structure. That is, as shown in FIG. 5, the movable structure may have a pair of torsion spring structures 180 connecting the movable plate 172 and the support 174, the torsion spring structure 180 being constituted by two torsion springs 182, which have the mesh structure.

Second Embodiment

As a second embodiment according to the present invention, FIG. 6 shows an optical switch element having a movable structure according to the present invention.

The optical switch element 200 comprises a movable structure and a substrate 232 supporting the movable structure. The movable structure comprises a rectangular movable plate 212, four supports 216 positioned around the movable plate 212 with respect to each side of the movable plate 212, and four support springs 214 connecting each side of the movable plate 212 and each of the supports 216.

The support spring 214 at least partially has a mesh structure. For example, as shown in FIG. 2, the support spring is entirely constituted by the mesh structure 150. Alternatively, as shown in FIG. 3, the support spring 214 partially has the mesh structure 150. That is, the support spring 214 has the mesh structure 150 and the platy portion 160.

The movable plate 212 is allowed to move so as to be closer to the substrate 232 by deflection deformation of the support spring 214. The movable plate 212 has a mirror 218 for reflecting the light, which is fixed to the front side (surface seen in FIG. 6) of the movable plate 212.

The support 216 is fixed to the substrate 232. The substrate 232 has a drive electrode 234 opposed to the movable plate 212. The movable plate 212 can be moved closer to the substrate 232 by giving an appropriate potential difference between the movable plate 212 and the drive electrode 234. For example, when the movable plate 212 is maintained to the ground potential and a voltage is applied to the drive electrode 234, the movable plate 212 moves close to the substrate 232. Moreover, when application of the voltage is stopped, the movable plate 212 returns to the original position by the repulsive force of the support spring 214. As a result, the mirror 218 fixed to the movable plate 212 moves close to the substrate 232 in accordance with application of the voltage to the drive electrode 234, and moves away from the substrate 232 in accordance with stop of voltage application to the drive electrode 234.

The optical switch element 200 is arranged among three optical fibers 252, 254 and 256. Axes of the ends of the three optical fibers 252, 254 and 256 are all positioned on the same plane, the axes of the ends of the optical fiber 252 and the optical fiber 254 are positioned on the same straight line, and the axis of the end of the optical fiber 256 is positioned on a straight line orthogonal to the former straight line.

The mirror 218 has a reflection surface 220 for reflecting the light. The reflection surface 220 is orthogonal to the flat plane on which the axes of the ends of the three optical fibers 252, 254 and 256 are positioned, and has an inclination of 45 degrees with respect to the straight line on which the axes of the ends of the optical fiber 252 and the optical fiber 254 are positioned.

As to the three optical fibers 252, 254 and 256, for example, the optical fiber 252 is for output, and the remaining two optical fibers 254 and 256 are for input. The light outputted from the optical fiber 252 is selectively inputted to one of the two optical fibers 254 and 256 by the optical switch element 200.

In the non-drive mode, namely, when the voltage is not applied to the drive electrode 234, the optical switch element 200 is arranged in such a manner that the mirror 218 is positioned between the optical fiber 252 and the optical fiber 254 and the light beam from the optical fiber 252 is reflected toward the optical fiber 256. In this state, the light beam emitted from the optical fiber 252 is reflected on the reflection surface 220 of the mirror 218 and enters the optical fiber 256.

When the voltage is applied to the drive electrode 234, the movable plate 212 moves close to the substrate 232. As a result, the mirror 218 deviates from the straight line on which the axes of the ends of the optical fiber 252 and the optical fiber 254 are positioned. In other words, the mirror 218 is moved away from the optical path of the light beam emitted from the optical fiber 252. When the optical switch element 200 is driven, namely, when the voltage is applied to the drive electrode 234, the light beam emitted from the optical fiber 252 advances straightforward and enters the optical fiber 254.

When application of the voltage to the drive electrode 234 is stopped, the movable plate 212 is moved away from the substrate 232 and returned to the original position by the repulsive force of the support spring 214. As a result, the mirror 218 returns to the straight line on which the axes of the ends of the optical fiber 252 and the optical fiber 254 are positioned. That is, the mirror 218 is inserted into the optical path of the light beam emitted from the optical fiber 252.

As similar to the torsion springs 114 and 118 according to the first embodiment, the support spring 214 has the mesh structure 150 illustrated in FIGS. 2 and 3. Since the element structures 152 of the mesh structure 150 are not separated from each other, sticking of the element structure 152 of the mesh structure 150 and movement of the element structures 152 of the mesh structure onto the movable plate or the support does not occur even when an impact shock is given to the optical switch element 200. That is, abnormal deformation of the support spring 214 is not generated.

Therefore, in the optical switch element 200 according to this embodiment, improvement in the drive efficiency and reduction in the non-linearity of the drive characteristic are achieved while maintaining the impact resistance.

This embodiment can be modified in many ways without departing from the scope of the present invention.

Although the element structure in the mesh structure of the support spring has a rhombic shape in this embodiment, the present invention is not restricted thereto, it may have any other arbitrary shape such as other polygons, a circle or an ellipse. The mesh structure is composed of one type of the element structure in this embodiment, it may include kinds of element structures having different dimensions or shapes.

As a material of the support spring, it is possible to apply any elastic material, e.g., a semiconductor material such as silicon or silicon carbide, an organic insulation material such as a polyimide resin, silicon resin, fluorocarbon resin or parylene, an inorganic insulation material such as silicon oxide or silicon nitride, or a metallic material such as aluminium or phosphor bronze. When the support spring is formed of a material having the insulation property, wirings for electrical connection to the movable plate may be formed on the surface or to the inside of the support spring.

Third Embodiment

Figure 7:
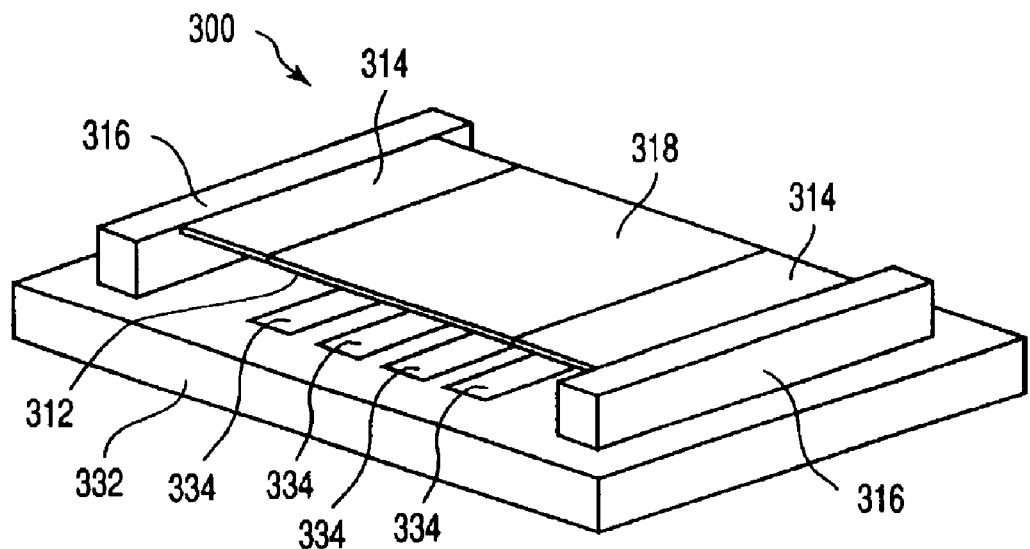
FIG. 7 shows a shape variable mirror having the movable structure according to the present invention as a third embodiment of the present invention.

As a third embodiment according to the present invention, FIG. 7 shows a shape variable mirror having the movable structure according to the present invention.

The shape variable mirror 300 includes a movable structure and a substrate 332 supporting the movable structure. The movable structure comprises a deformable elastic film 312 having a reflection surface, a pair of supports 316 positioned on the both sides of the elastic film 312, and a pair of support springs 314 connecting the elastic film 312 and the support 316.

The support springs 314 at least partially have the mesh structure. For example, as shown in FIG. 2, each of the support spring 314 is entirely constituted by the mesh structure 150. Alternatively, as shown in FIG. 3, the support spring 314 partially has the mesh structure 150. That is, the support spring 314 has the mesh structure 150 and a platy portion 160.

The substrate 332 has electrodes 334 opposed to the elastic film 312. A metal film 318 is formed on the front side (surface seen in FIG. 7) of the elastic film 312. The metal film 318 functions as the reflection surface for reflecting the light and also serves as an opposed electrode with respect to the electrodes 334 of the substrate 332.

When a voltage is applied to the electrodes 334 while maintaining the metal film 318 to a ground potential, the elastic film 312 is attracted to the electrodes 334 by the electrostatic attraction. As a result, the shape of the reflection surface of the elastic film 312 can be changed. Further, by independently applying an appropriate voltage to each of the electrodes 334, the shape of the reflection surface of the elastic film 312 can be one-dimensionally and substantially arbitrarily changed.

As similar to the torsion springs 114 and 118 according to the first embodiment, the support spring 314 has the mesh structure 150 illustrated in FIGS. 2 and 3. Since element structures 152 of the mesh structure 150 are not separated from each other, sticking of the element structures 152 of the mesh structure 150 and movement of the element structures 152 of the mesh structure 150 onto the elastic film or the support does not occur even when an impact shock is given to the shape variable mirror 300. That is, abnormal deformation of the support spring 314 is not generated.

Therefore, in the shape variable mirror 300 according to this embodiment, improvement in the drive efficiency and reduction in the non-linearity of the drive characteristic are achieved while maintaining the impact resistance.

This embodiment can be modified in many ways without departing from the scope of the present invention.

Although the element structures in the mesh structure of the support spring have the rhombic shape in this embodiment, the present invention is not restricted thereto, and it may have any other arbitrary shape such as other polygons, a circle or an ellipse. The mesh structure is composed of one type of the element structure, but it may include a plurality of types of element structures having different dimensions or shapes.

As a material of the support spring, it is possible to apply any elastic material, e.g., a semiconductor material such as silicon or silicon carbide, an organic insulation material such as a polyimide resin, silicon resin, fluorocarbon resin or parylene, an inorganic insulation material such as silicon oxide or silicon nitride, or a metallic material such as aluminium or phosphor bronze. When the support spring is formed of a material having the insulation property, wirings for electrical connection to the movable plate may be formed on the surface or to the inside of the support spring.

In the shape variable mirror 300 according to this embodiment, although the elastic film 312 is connected to the support 316 only through the support springs 314 having the mesh structures extending from the opposed two sides, the connection structure of the elastic film and the supports is not restricted thereto, and it may be modified in many ways.

Figure 8:
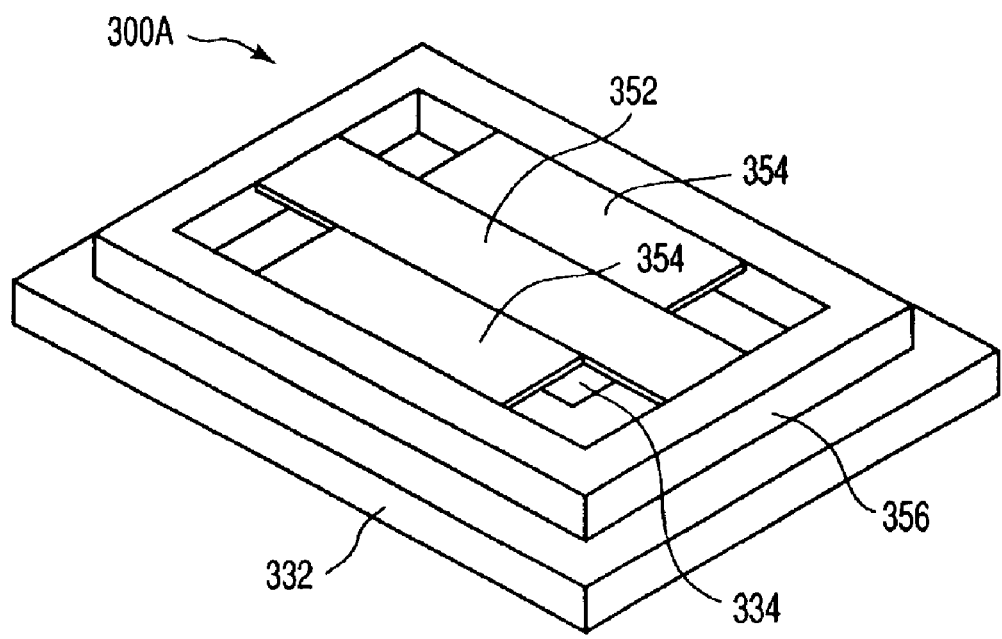
FIG. 8 shows a modification of a shape variable mirror according to the third embodiment.

FIG. 8 shows a modification of the shape variable mirror according to this embodiment based on a different connection structure of the elastic film and the support. In FIG. 8, like reference numerals denote members equal to those in FIG. 7.

In the shape variable mirror 300A of this modification, as shown in FIG. 8, the movable structure comprises a deformable elastic film 352 having a reflection surface formed thereto, a support frame 356 surrounding the elastic film 352, and a pair of support springs 354, which include the mesh structure, connecting the elastic film 352 and the support frame 356, the elastic film 352 having opposed two sides directly connected to the support frame 356, and the other two sides connected to the support frame 356 through the support spring 354.

The shape variable mirror 300A according to this modification is inferior to the shape variable mirror 300 according to this embodiment in the drive efficiency or the linearity, but has an advantage that the flatness of the reflection surface is improved.

Figure 9:
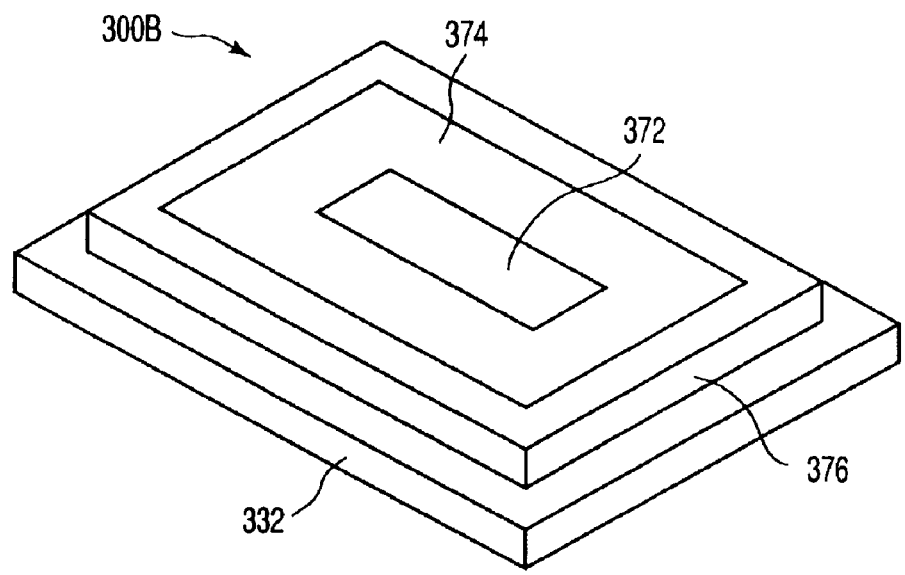
FIG. 9 shows another modification of the shape variable mirror according to the third embodiment.

FIG. 9 shows another modification of the shape variable mirror according to this embodiment based on a different connection structure of the elastic film and the support. In FIG. 9, like reference numerals denote members equal to those in FIG. 7.

In the shape variable mirror 300B according to this modification, as shown in FIG. 9, the movable structure comprises a deformable elastic film 372 having a reflection surface formed thereto, a support frame 376 surrounding the elastic film 372, and a support spring 374, which includes the mesh structure, connecting the elastic film 372 and the support frame 376, the support spring 374 connecting four sides of the elastic film 372 with four sides of the support frame 376.

The shape variable mirror 300B according to this modification has an advantage that the flatness of the reflection surface is improved as compared with the shape variable mirror 300 according to this embodiment in addition to the advantage of the shape variable mirror 300 according to this embodiment.

Support of the movable body by the spring having the mesh structure based on the present invention may be applied to an element adopting any drive mode such as dynamic non-resonance drive or resonance drive as well as an element that is statically driven. In addition, in the above-described embodiment, the element adopting the electrostatic drive mode is illustrated, the drive mode for the element is not restricted thereto, and it may be applied to an element which is driven by any other arbitrary mode such as electromagnetic drive or electric heating drive.

Fourth Embodiment

Figure 10:
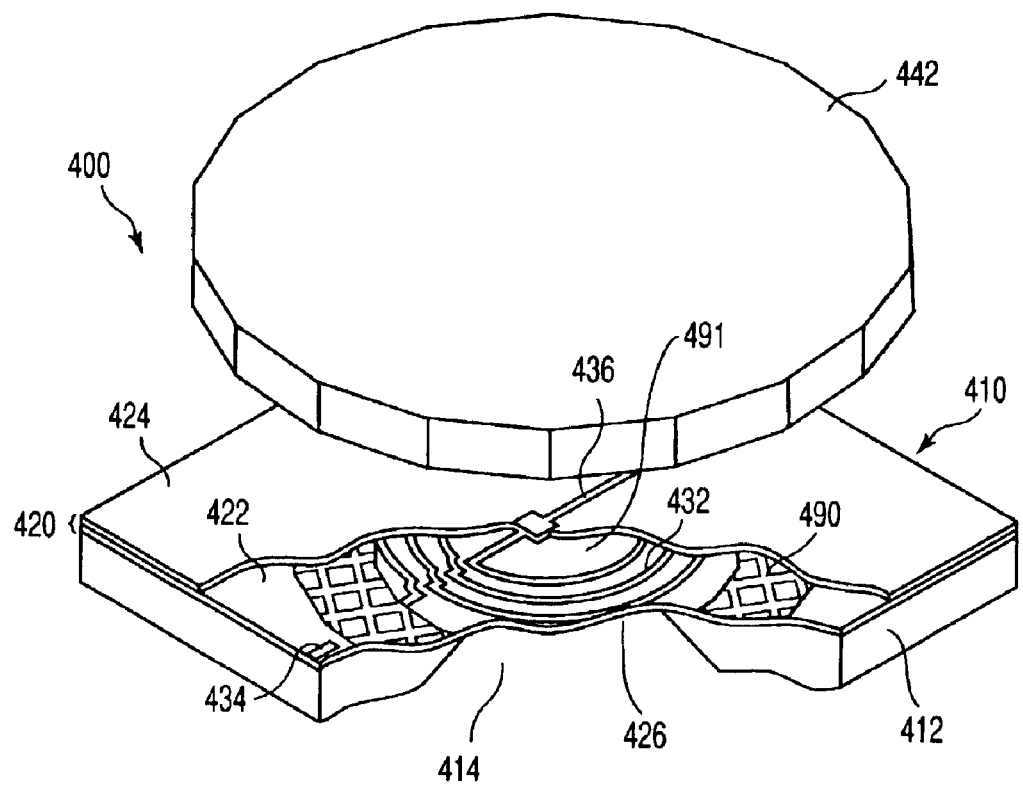
FIG. 10 is a partially sectional perspective view of a shape variable mirror according to a fourth embodiment of the present invention.
Figure 11:
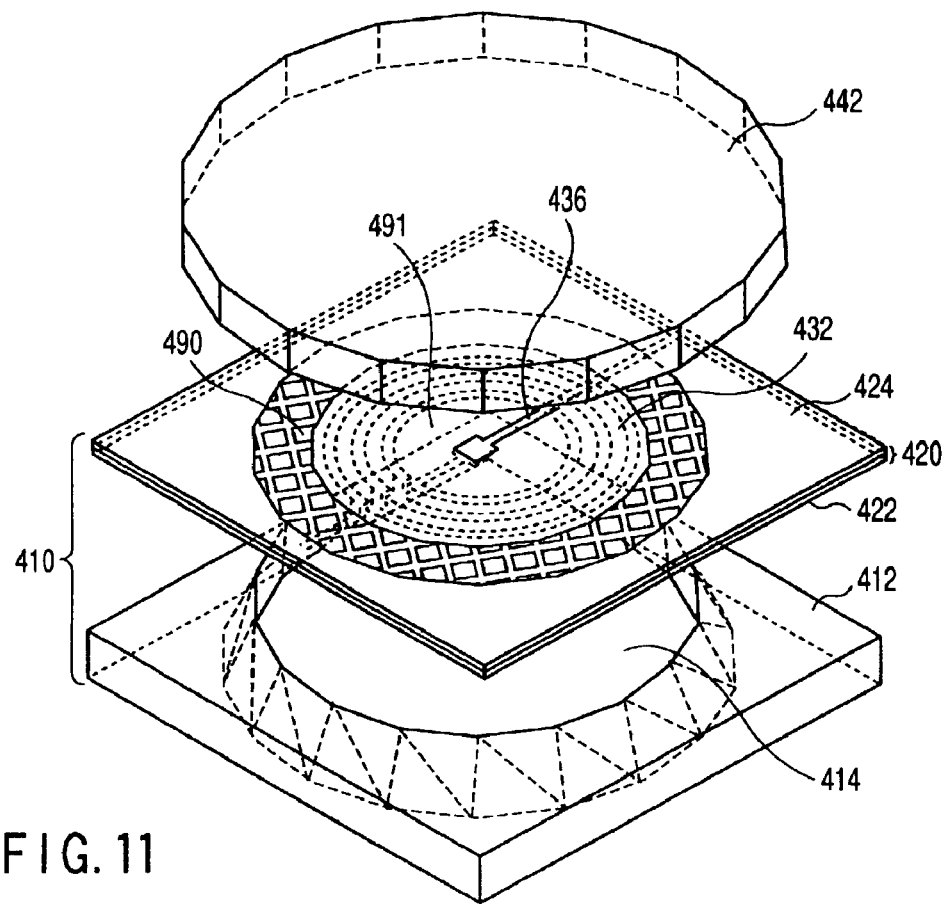
FIG. 11 is an exploded perspective view showing a mirror structure of the shape variable mirror illustrated in FIG. 10.

As shown in FIGS. 10 and 11, a shape variable mirror 400 according to this embodiment includes a mirror structure 410, which comprises a support frame 412 having a circular opening portion 414, an elastically deformable insulation film 420, which is held by the support frame 412 covering the opening portion 414, a reflection surface 426 formed on the surface of the insulation film 420, and a circular flat coil 432, a drive line, formed inside the insulation film 420.

The insulation film 420 comprises polyimide films 422 and 424 having the double structure. Additionally, when a part of these films is subjected to the etching process, a mirror portion 491 and a polyimide mesh 490 are formed. The flat coil 432 is formed between the polyimide films 422 and 424, positioned on the inner side of the mirror portion 491, and substantially circularly extending along the contour of the mirror portion 491. The reflection surface 426 is formed on the surface of the polyimide film 422 and positioned on the inner side of the mirror portion 491.

The outer end of the flat coil 432 is electrically connected with a wiring 434 which extends between the polyimide films 422 and 424, and the inner end of the flat coil 432 is electrically connected with a wiring 436 which extends on the polyimide film 424 through a via hole formed to the polyimide film 424. A current generated by an external power supply device is supplied to the flat coil 432 through a wiring formed on the surface or to the inside of the polyimide mesh 490, the wiring 434 and the wiring 436.

Figure 12:
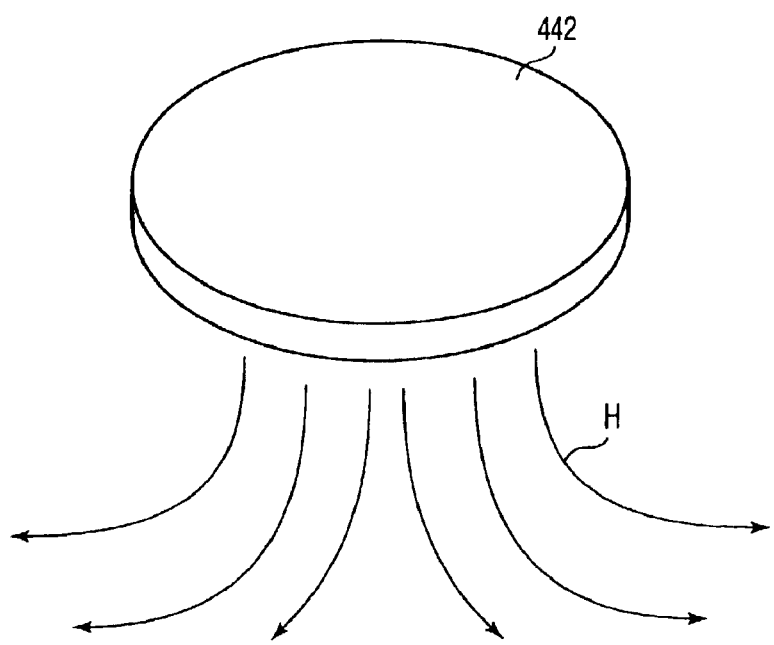
FIG. 12 shows a permanent magnet depicted in FIG. 10 and a magnetic field generated by the permanent magnet.

The shape variable mirror 400 further includes a permanent magnet 442, magnetic field generator, generating a magnetic field traversing the flat coil 432. The permanent magnet 442 is magnetized in a direction vertical to the reflection surface 426 to generates a magnetic field H, which distributes symmetrically with respect to an axis running through the center of the flat coil 432 and the reflection surface 426, as shown in FIG. 12. As shown in FIG. 13, the magnetic field H generated by the permanent magnet 442 includes a component $H_0$ radially traversing the flat coil 432 in parallel to a flat surface including the flat coil 432 with no deformation, in other words, the surface of the insulation film 420.

The operation of the shape variable mirror 400 will now be described.

In FIG. 13, the flat coil 432 is positioned in the magnetic field H generated by the permanent magnet 442. When a current I is passed to the flat coil 432, the flat coil 432 receives the Lorentz force F vertical to the flat surface (polyimide films 422 and 424) including the flat coil 432 by the interaction of the component $H_0$ of the magnetic field H parallel to the flat surface (polyimide films 422 and 424) including the flat coil 432 and the current I flowing through the flat coil 432.

Since the magnetic field component $H_0$ distributes symmetrically with respect to the center of the substantially circularly extending flat coil 432, diametrically opposed parts of the flat coil 432 receive the equal Lorentz force F, namely, the Lorentz force F having the same magnitude and direction.

Based on this Lorentz force F, the polyimide films 422 and 424 are elastically deformed symmetrically with respect to the center of the flat coil 432. As a result, the reflection surface 426 formed to the surface of the polyimide film 422 is also deformed symmetrically with respect to the center of the flat coil 432.

The magnitude of the Lorentz force received by each part of the flat coil 432 depends on the greatness of the current flowing through the flat coil 432, and the direction of the Lorentz force received by each part of the flat coil 432 depends on the direction of the current flowing through the flat coil 432. Therefore, by controlling the greatness of the direction of the current to be supplied to the flat coil 432, the shape of the reflection surface 426 can be changed.

That is, by controlling the direction of the current to be supplied to the flat coil 432, the condensing power of the reflection surface 426 can be changed to be positive or negative, namely, the reflections surface 426 can be changed to a concave surface or a convex surface. Further, by controlling the greatness of the current to be supplied to the flat coil 432, the greatness of the condensing power of the reflection surface 426, i.e., the degree of curvature of the concave surface or the convex surface can be continuously changed.

The shape of the concave shape or the convex shape depends on not only the greatness of the current flowing through the flat coil 432 but also the elastic characteristic of the insulation film 420, i.e., the polyimide films 422 and 424.

Incidentally, although the current also flows to the wiring 434 and the wiring 436 as well as the flat coil 432, the wiring 434 and the wiring 436 linearly extend through the center of the flat coil 432, and the direction of the current flowing through these members becomes parallel to the direction of the magnetic field component $H_0$. Therefore, the symmetric property of the shape of the reflection surface 426 is not deteriorated by the Lorentz force received by these members.

The shape variable mirror according to this embodiment is of the electromagnetic drive type, and a distance between the flat coil 432 and the permanent magnet 442 may be considerably long as compared with the electrode distance in the shape variable mirror of the electrostatic drive type described as the third embodiment. That is, as compared with the electrostatic drive type shape variable mirror, the shape variable mirror according to this embodiment has no member or the like that interrupts deformation of the reflection surface near the reflection surface. Furthermore, by changing the permanent magnet to one that generates the stronger magnetic field H, increase in the Lorentz force can be readily attained. Therefore, as compared with the electrostatic drive type shape variable mirror, improvement in a deformation amount of the reflection surface can be easily realized.

Moreover, since the Lorentz force for displacing the reflection surface is fixed irrespective of a deformation amount of the reflection surface, control over the shape of the reflection surface can be readily performed. In addition, by changing the direction of the current flowing to the flat coil, the reflection surface can be deformed into both of the concave surface and the convex surface. Additionally, since the mirror structure 410 which is a primary structure in the shape variable mirror 400 does not have a hollow portion, it can be readily manufactured by the semiconductor microfabrication technology.

A preferred modification of the shape variable mirror according to this embodiment will now be described with reference to FIGS. 10 and 14. The shape variable mirror of this modification is an example in which a number of drive line is changed into a plural number, and one flat coil 432 illustrated in FIG. 10 is substituted by three flat coils 432a, 432b and 432c depicted in FIG. 14. The both ends of the flat coils 432a, 432b and 432c are respectively electrically connected to wirings 434a, 434b and 434c and wirings 436a, 436b and 436c.

As can be readily imagined with reference to FIG. 10, the flat coils 432a, 432b and 432c are formed between the polyimide film 422 and the polyimide film 424, the wirings 434a, 434b and 434c and the wirings 436a, 436b and 436c are formed on the polyimide film 424, and they are electrically connected with the ends of the flat coils 432a, 432b and 432c through via holes formed on the polyimide film 424.

In this modification, by supplying an arbitrary current to an arbitrary drive line in the flat coils 432a, 432b and 432c, the shape of the reflection surface can be further accurately controlled, or it can be controlled to a further complicated shape. Further, for example, by combining opposed currents and supplying it to the drive lines, the reflection surface can be partially controlled to a shape including the concave surface and the convex surface.

In this embodiment, although the polyimide films 422 and 424 are used as the elastically deformable insulation film 420, any other resin material, a silicon oxide film, silicon nitride film or the like may be used. Furthermore, a piezoelectric resistance element or the like may be formed on the surface or to the inside of the reflection surface for the purpose of detecting a quantity of displacement of the reflection surface. The flat coil has a circular shape, but it may have a more complex shape such as an ellipse, etc.

Fifth Embodiment

Figure 15:
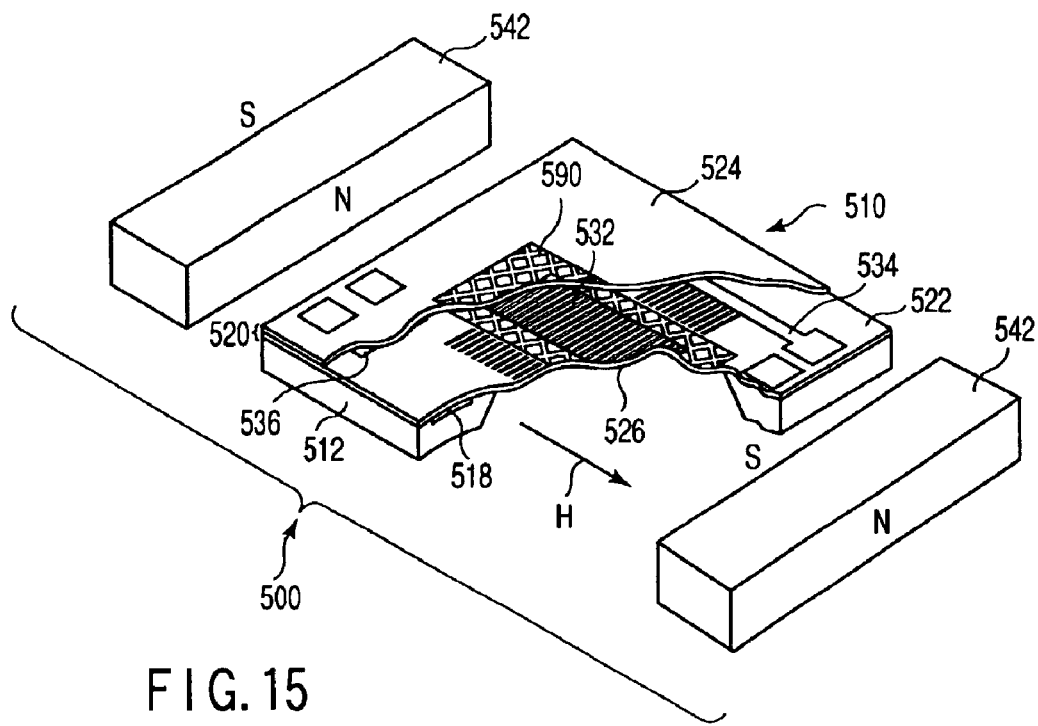
FIG. 15 is a partially sectional perspective view of a shape variable mirror according to a fifth embodiment of the present invention.
Figure 16:
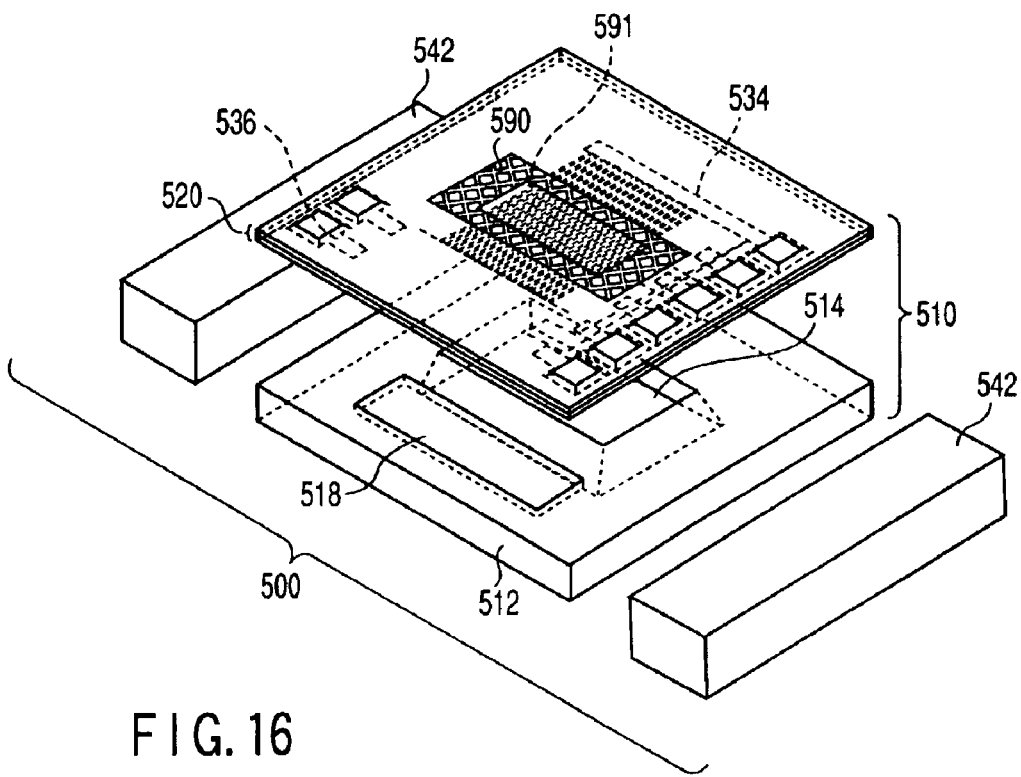
FIG. 16 is an exploded perspective view showing a mirror structure of the shape variable mirror illustrated in FIG. 15.

As shown in FIGS. 15 and 16, a shape variable mirror 500 according to this embodiment includes a mirror structure 510, which comprises a support frame 512 having a rectangular opening portion 514, an elastically deformable insulation film 520, which is held by the support frame 512 covering the opening portion 514, a reflection surface 526 formed on the surface of the insulation film 520, and at least one drive line 532 formed in the insulation film 520.

The mirror structure 510 preferably has a plurality of drive lines 532, and also includes a drive line selection circuit 518 for selecting a drive line 532 to which a current is supplied, and wirings 534 and 536 for electrically connecting the drive line 532 and the drive line selection circuit 518 to an external power supply device as a current supply source.

The insulation film 520 comprises polyimide films 522 and 524 having the double structure. Furthermore, when a part of these film is subjected to the etching process, a mirror portion 591 and a polyimide mesh 590 are formed. The drive line 532 is formed between the polyimide films 522 and 524, and has a straight part extending straightforward on the inner side of the mirror portion 591. Each of the drive lines 532 actually extends straightforward over the entire length. The drive lines 532 extend in parallel to each other, are aligned along an axis orthogonal to the longitudinal axis of the drive lines, and one-dimensionally arranged.

Ends of the drive lines 532 on one side are all electrically connected to the wiring 534 through the wiring formed in the polyimide mesh, and ends of the drive lines 532 on the other side are connected to the drive line selection circuit 518 formed inside the support frame 512 through the wiring formed in the polyimide mesh and the via holes formed to the polyimide film 522. The drive lines 532 and the drive line selection circuit 518 are connected to the external power supply device for supplying the current to the drive line 532 through the wirings 534 and 536.

The reflection surface 526 is formed on the surface of the polyimide film 522, and covers an area including at least the drive lines 532 on the inner side of the opening portion 514.

Figure 17:
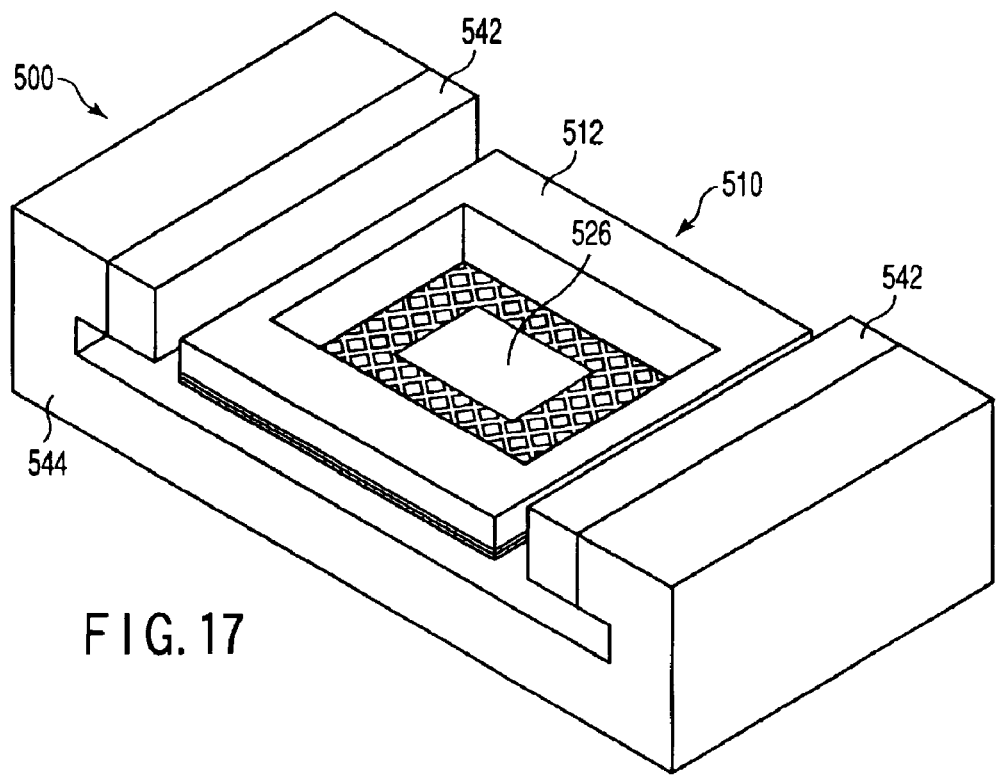
FIG. 17 shows how permanent magnets of FIG. 15 is fixed to a yoke.

The shape variable mirror 500 further includes a pair of permanent magnets, magnetic field generator, generating a magnetic field traversing the drive lines 532. The permanent magnets 542 are magnetized in a direction of arrangement of the drive lines 532 to generate a magnetic field H, which is orthogonal to the longitudinal axis of the drive lines 532 and parallel to the reflection surface 526. The permanent magnets 542 are preferably, as shown in FIG. 17, fixed to the yoke 544. The yoke 544 increases and uniformizes the intensity of the magnetic field H, and give an advantage of improvement in drive force of the drive lines 532 and uniformity of the drive characteristic.

The operation of the shape variable mirror 500 will now be described.

In FIG. 15, the drive lines 532 are positioned in the magnetic field H generated by the permanent magnets 542. A current I flows to a drive line 532 among the drive liens 532 selected by the drive line selection circuit 518. The drive line 532 to which the current I flows receives the Lorentz force F vertical to the surface of the insulation film 520 (polyimide films 522 and 524) by the interaction of the magnetic field H and the current I. Based on this Lorentz force F, the polyimide films 522 and 524 are elastically deformed in the direction of the normal line. As a result, the reflection surface 526 formed on the surface of the polyimide film 522 is also deformed in the direction of the normal line.

At least one drive line 532 to which the current is supplied is selected by the drive line selection circuit 518. The drive line selection circuit 518 can select arbitrary one or more from the drive lines 532. Therefore, by controlling selection of the at least one drive line 532 to which the current is supplied by using the drive line selection circuit 518, the reflection surface 526 can be changed into an arbitrary shape along the axis orthogonal to the longitudinal axis of the drive line 532. That is, the shape of the reflection surface 526 can be one-dimensionally arbitrarily changed. Moreover, by switching the direction of voltage application carried out by the external power supply device, the reflection surface 526 can be changed into a concave shape or a convex shape.

Since the shape variable mirror according to this embodiment has no member or the like that interrupts deformation of the reflection surface, so that the Lorentz force can be readily increased by changing the permanent magnet to one that can generate a stronger magnetic field, improvement in a deformation amount of the reflection surface is easily realized. That is, there can be obtained the shape variable mirror whose reflection surface can be greatly deformed. In addition, the Lorentz force for displacing the reflection surface is fixed irrespective of a deformation amount of the reflection surface, and the shape of the reflection surface can be readily controlled. In addition, by changing the direction of the current to be supplied to the drive line, the reflection surface can be deformed to both the concave surface and the convex surface. Additionally, by changing the drive line to which the current is supplied, the reflection surface can be deformed into various shapes. Further, since the mirror structure 510 does not have the hollow portion, the shape variable mirror can be readily manufactured by using the semiconductor micro-fabrication technology. Since the drive line selection circuit is included in the support frame, the entire structure of the shape variable mirror is minimized.

This embodiment can be modified in may ways without departing from the scope of the present invention.

For example, as a constituent material of the elastically deformable insulation film 520, the polyimide films 522 and 524 may be substituted by any other resin material, a silicon oxide film or a silicon nitride film. Moreover, in order to detect a deformation amount of the reflection surface, a piezoresistance element or the like may be provided on the surface or to the inside of the reflection surface.

Although the drive line selection circuit 518 is formed to the support frame 512, it may be provided to the outside of the shape variable mirror 500. In addition, in place of the drive line selection circuit 518, a current control circuit that controls the greatness of the current flowing to the drive line may be provided. Alternatively, in addition to the drive line selection circuit 518, a current control circuit that controls the greatness of the current flowing to the drive line may be provided. In other words, the drive line selection circuit 518 may have a function to control the greatness of the current flowing to the drive line.

Sixth Embodiment

Figure 18:
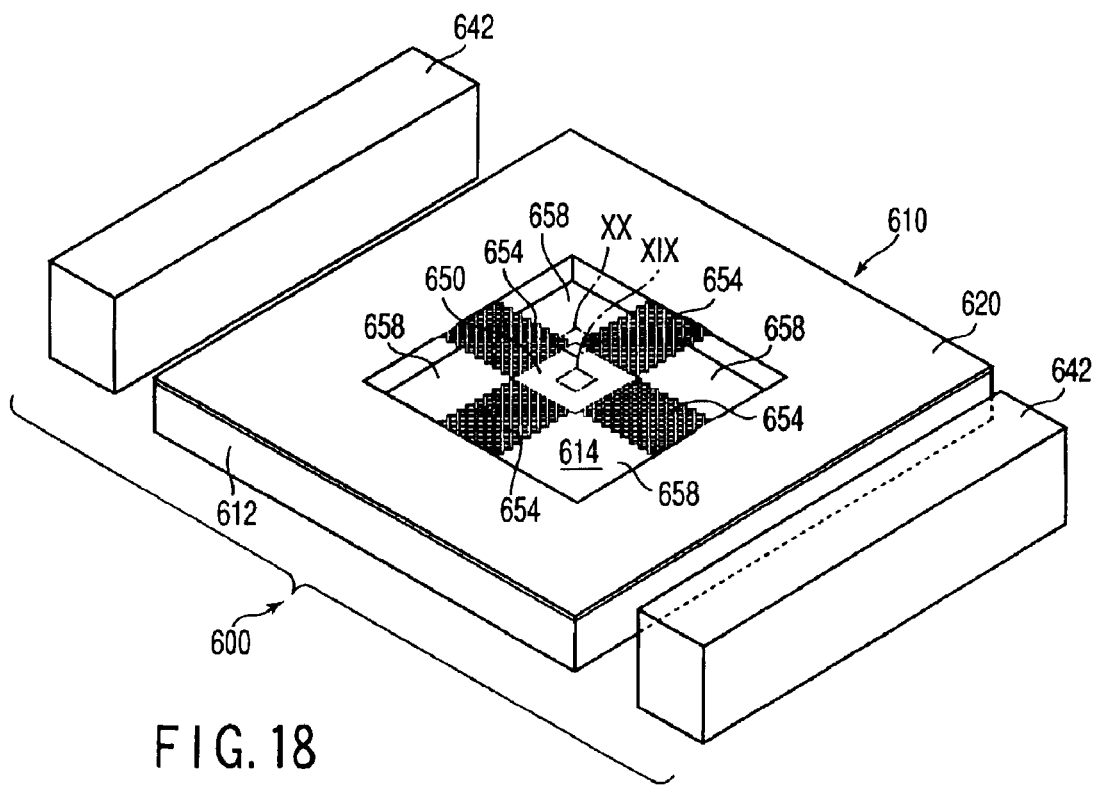
FIG. 18 is a partially sectional perspective view of a shape variable mirror according to a sixth embodiment of the present invention.
Figure 20:
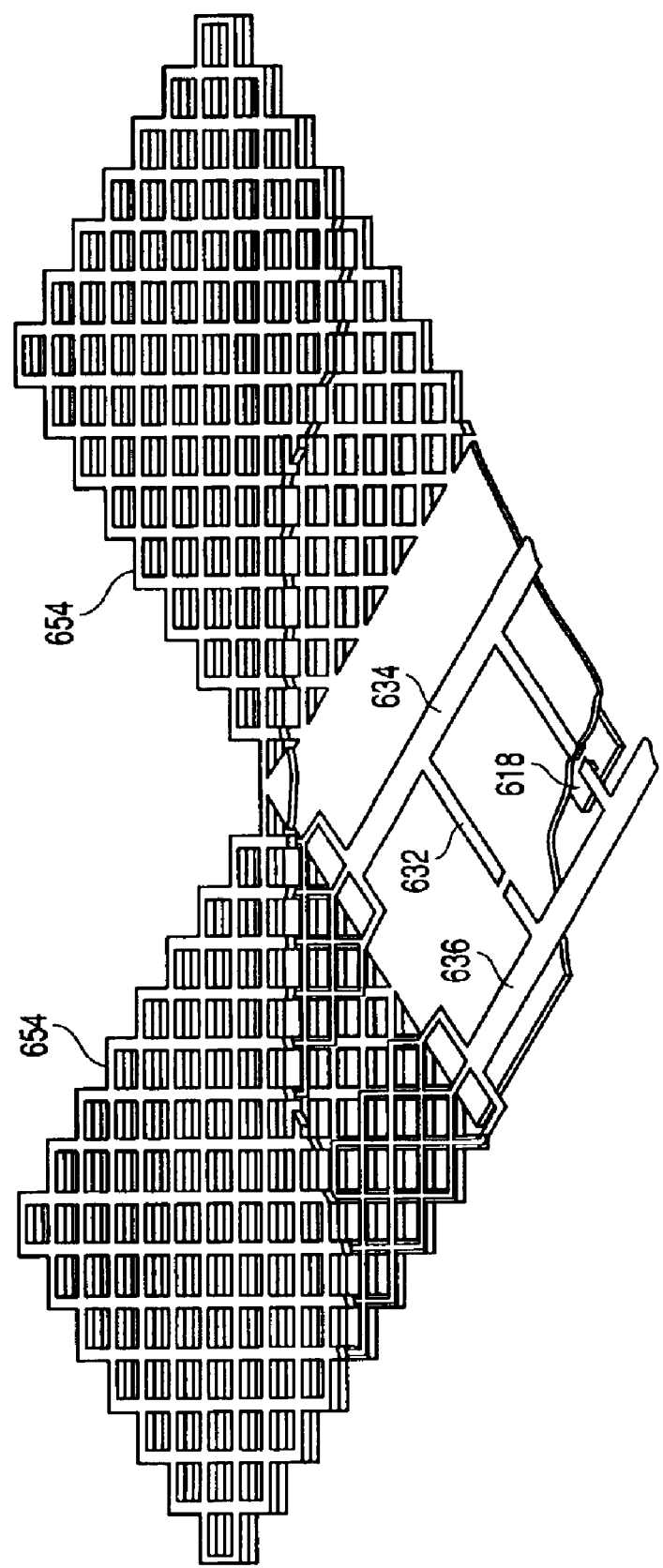
FIG. 20 is a partially sectional perspective view showing an area XX surrounded by a chain line in FIG. 18 in the enlarged manner.
Figure 21:
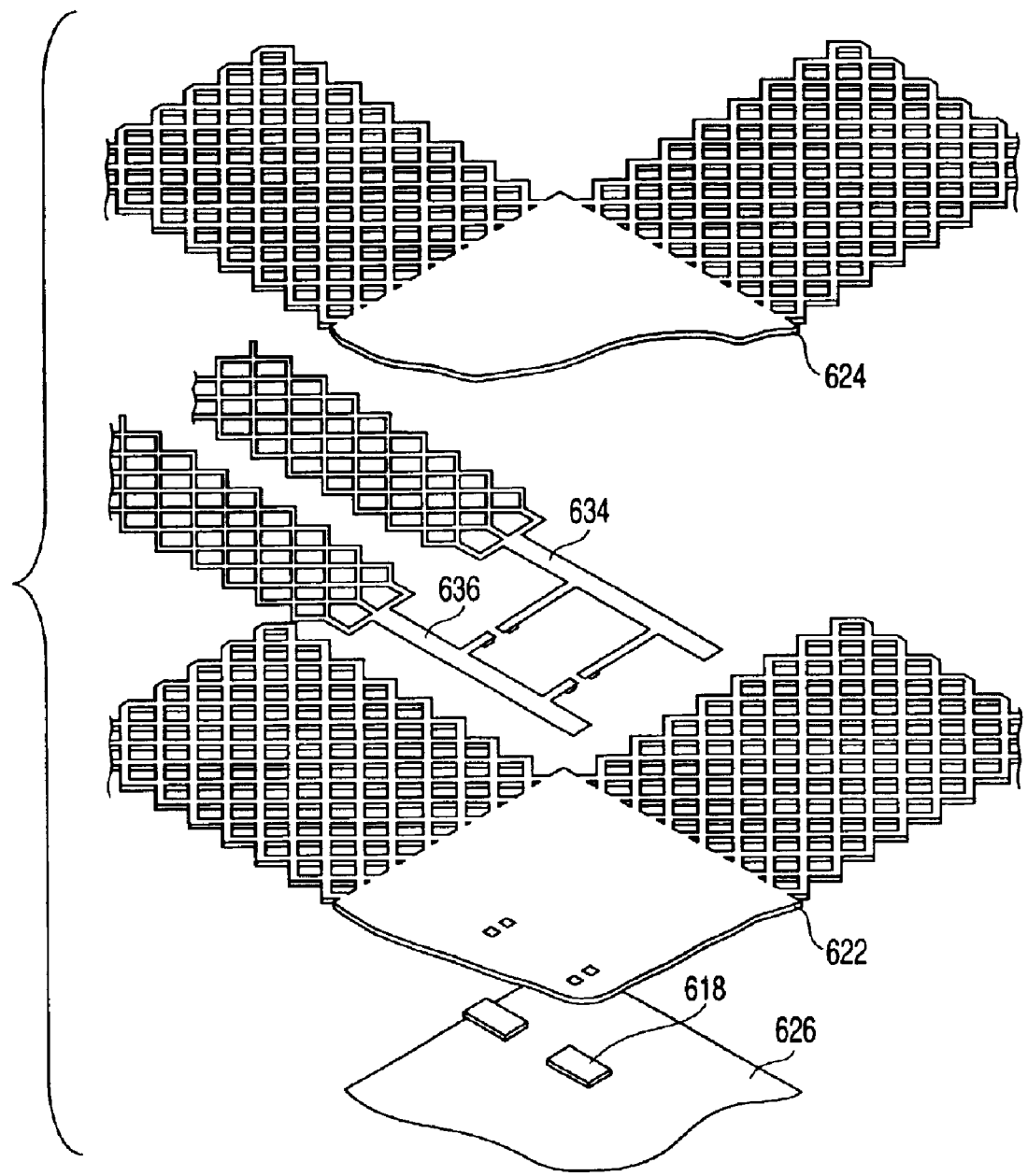
FIG. 21 is an exploded perspective view showing the part of the mirror structure illustrated in FIG. 20.
Figure 22:
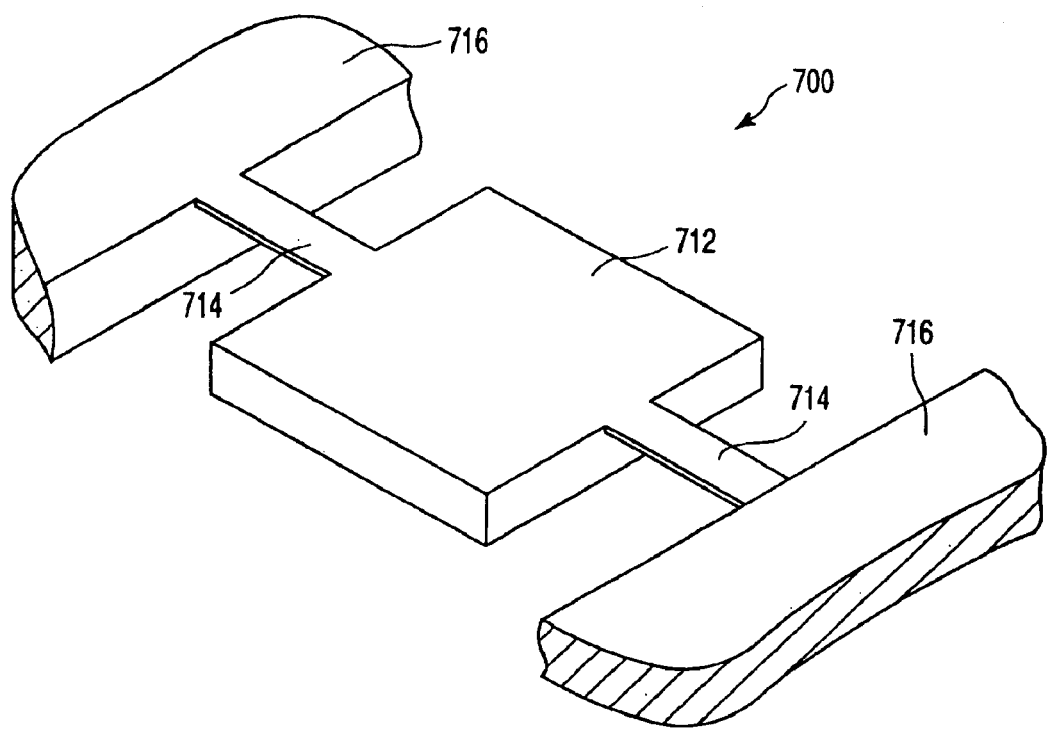
FIG. 22 shows a movable structure, which is often used in a micromachine element.
Figure 23:
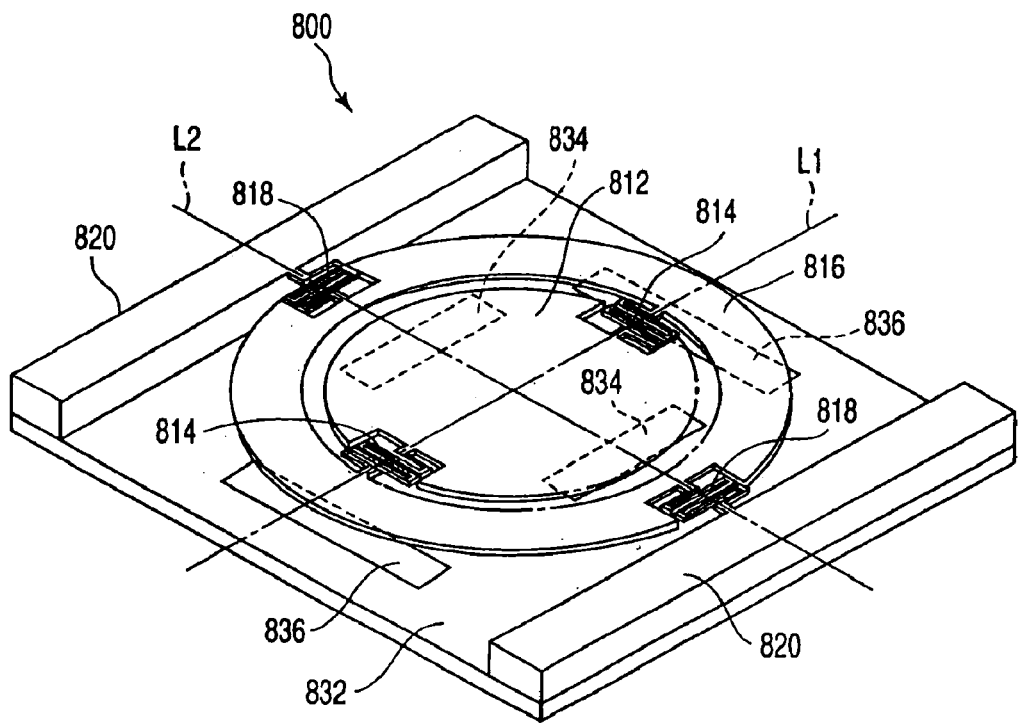
FIG. 23 shows a deflection mirror element including a movable structure having a flexuous structure spring.
Figure 24:
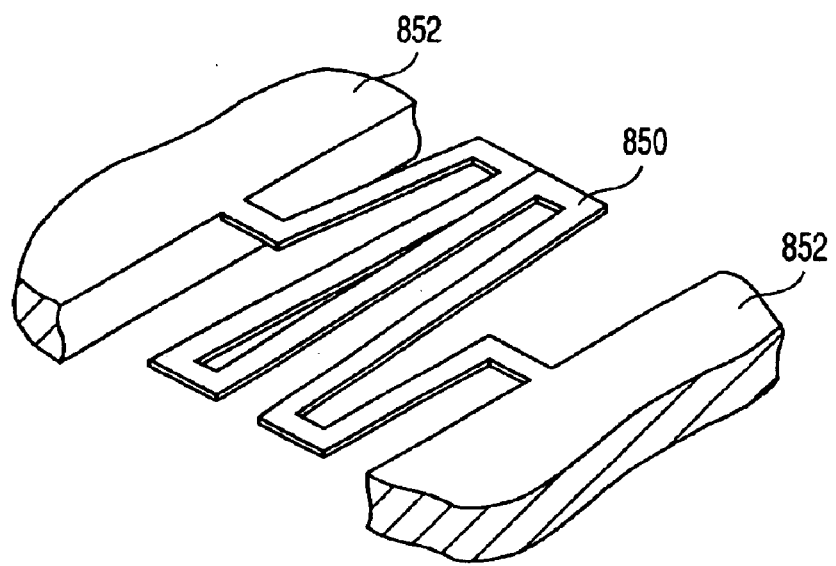
FIG. 24 shows the state that a part of the flexuous structure spring of the movable structure illustrated in FIG. 23 is attached and can not be removed.
Figure 25:
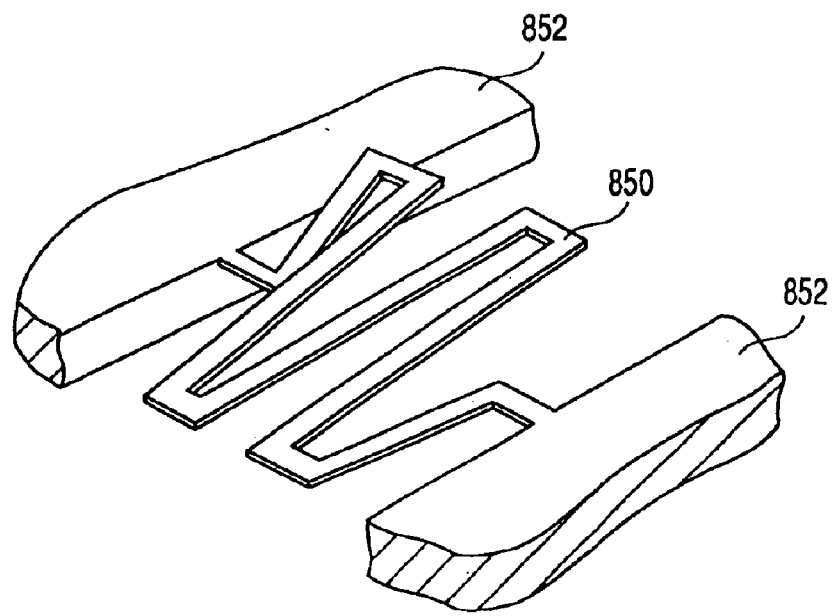
FIG. 25 shows the state that the flexuous structure spring of the movable structure illustrated in FIG. 23 moves onto a support portion corresponding to a support or a movable body and can not return to its original position.

As shown in FIG. 18, the shape variable mirror 600 according to this embodiment includes a mirror structure 610, which comprises a support frame 612 having a rectangular opening portion 614, and an elastically deformable insulation film 620 held by the support frame 612. The insulation film 620 has rectangular notch portions 658 at four corners of the opening portion 614, and contours of a rectangular central portion 650 positioned in the center of the opening portion 614 and four connection portions 654 extending between the central portion 650 and the support frame 612 are consequently defined. As shown in FIGS. 20 and 21, the connection portions 654 have many small rectangular opening portions formed so as to give the mesh-like appearance.

Figure 19:
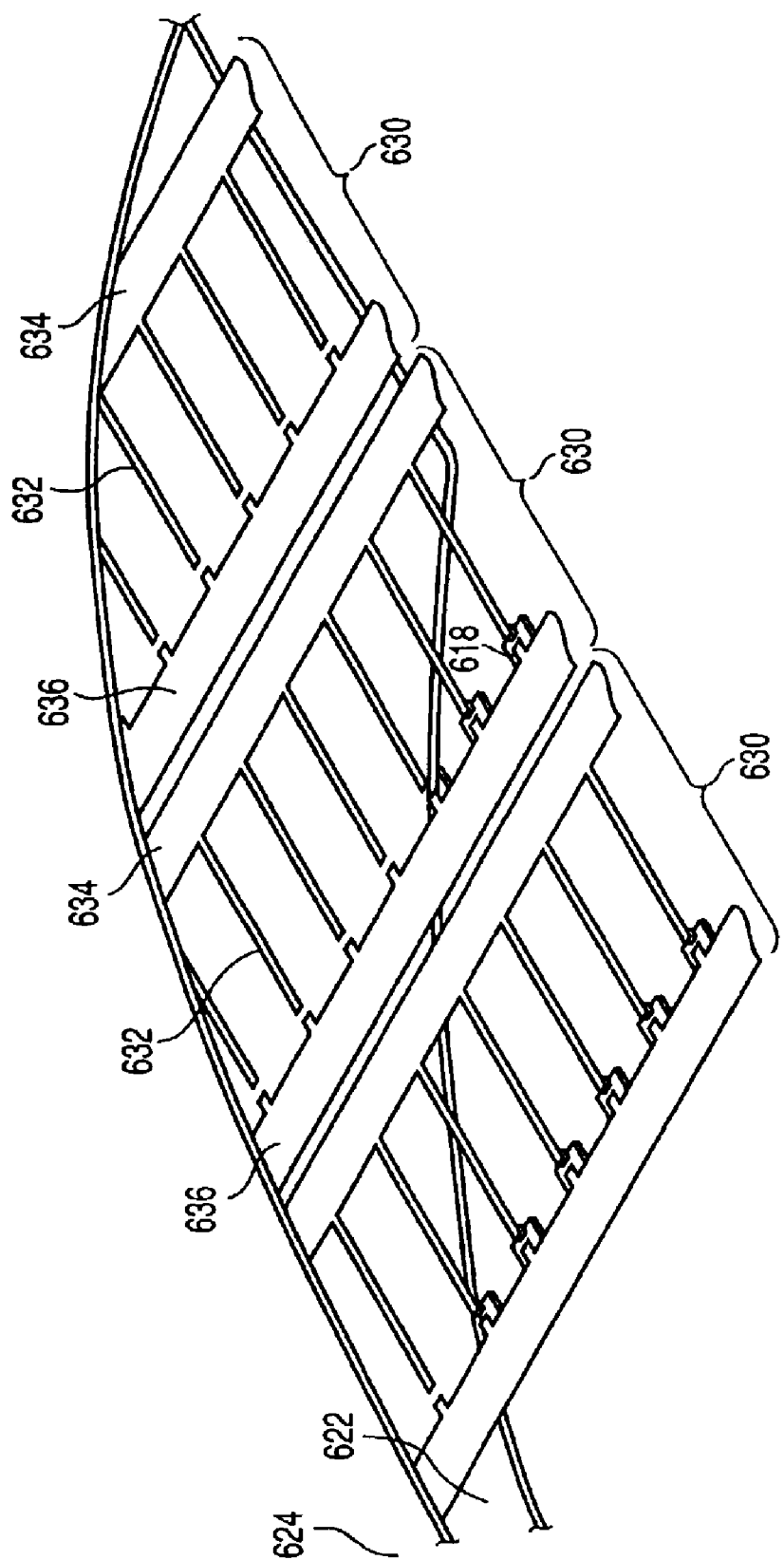
FIG. 19 is a partially sectional perspective view showing an area XIX surrounded by a chain line in FIG. 18 in the enlarged manner.

As shown in FIGS. 19, 20 and 21, the mirror structure 610 further includes drive lines 632 formed in the central portion 650 of the insulation film 620, drive line selection circuits 618 for selecting drive lines 632 to which the current is supplied, and wirings 634 and 636 for electrically connecting the drive lines 632 and the drive line selection circuits 618 with an external power supply device as a current supply source.

In these drawings, although reference numeral 632 denoting the drive line indicates a part extending between the wiring 634 and the drive line selection circuit 618, it actually includes an entire line element extending between the wirings 634 and 636, i.e., both the line element part extending between the wiring 634 and the drive line selection circuit 618 and the line element part extending between the drive line selection circuit 618 and the wiring 636.

The drive line selection circuit 618 is silicon film pieces having elements required for the circuit configuration formed thereto, and these are aligned at fixed intervals and dotted on the surface (back side) of the polyimide film 622. As shown in FIG. 21, the mirror structure 610 further includes a reflection surface 626 formed on the surface (back side) of the central portion 650 of the insulation film 620. The reflection surface 626 covers the drive line selection circuit 618 existing in the central portion 650 of the insulation film 620.

As shown in FIG. 19, the insulation film 620 comprises the polyimide films 622 and 624 having the double structure, and the drive lines 632 are positioned between the polyimide films 622 and 624. The drive lines 632 constitute drive line groups 630. Respective drive lines 632 in the drive line group 630 extend in parallel to each other, and are aligned along an axis orthogonal to the longitudinal axis. The drive line groups 630 are aligned along the longitudinal axis of the drive lines 632. Therefore, the drive lines 632 are two-dimensionally arranged along the longitudinal axis and the axis orthogonal thereto.

Ends of the drive lines 632 in the drive line group 630 on one side are all electrically connected to the wiring 634, which extends between the polyimide films 622 and 624, and ends of the drive lines 632 in the drive line group 630 on the other side are connected to the drive line selection circuits 618 through via holes formed to the polyimide film 622. The drive lines 632 and the drive line selection circuits 618 are connected to the external power supply device for supplying the current to the drive lines 632 through the wirings 634 and 636.

Furthermore, as shown in FIG. 18, the shape variable mirror 600 further includes a pair of permanent magnets, magnetic field generator, generating a magnetic field coming across the drive lines 632. The permanent magnets 642 are magnetized in the direction of arrangement of the drive lines 632 to generate the magnetic field orthogonally traversing the longitudinal axis of the drive liens 632 in parallel to the reflection surface 626.

The operation of the shape variable mirror 600 will now be described.

In FIG. 19, the drive lines 632 are positioned in the magnetic field generated by the permanent magnets 642. The current flows the drive line 632 selected from the drive lines 632 by the drive line selection circuit 618. The drive line 632 to which the current flows receives the Lorentz force vertical to the surface of the insulation film 620 (polyimide films 622 and 624) by the interaction of the magnetic field and the current. Based on this Lorentz force, the polyimide films 622 and 624 are elastically deformed in the direction of the normal line. As a result, the reflection surface 626 formed on the surface of the polyimide film 622 is also deformed in the direction of the normal line.

The drive lines 632 are two-dimensionally arranged along the longitudinal axis of these lines and the axis orthogonal to this longitudinal axis, and the drive lines 632 aligned along the axis orthogonal to the longitudinal axis constitute one drive line group 630. In regard to each of the drive line groups 630, as similar to the fifth embodiment, the reflection surface 626 can be changed into an arbitrary shape along the axis orthogonal to the longitudinal axis of the drive lines 632. Moreover, since the drive line groups 630 are aligned along the longitudinal axis of the drive lines 632, the shape of the reflection surface 626 can be changed along the longitudinal axis of the drive lines 632. That is, the shape of the reflection surface 626 can be two-dimensionally arbitrarily changed. In addition, by switching the direction of the voltage application performed by the external power supply device, the reflection surface 626 can be changed into both the concave surface and the convex surface.

Since the shape variable mirror according to this embodiment has no member or the like that interrupts deformation of the reflection surface, so that the Lorentz force can be readily increased by changing the permanent magnet to one which can generate the stronger magnetic field, improvement in a deformation amount of the reflection surface is easily realized. That is, the shape variable mirror whose reflection surface can be greatly deformed can be obtained. Moreover, since the Lorentz force for displacing the reflection surface is fixed irrespective of a deformation amount of the reflection surface, the shape of the reflection surface can be easily controlled. Further, the reflection surface can be deformed into both the concave surface and the convex surface by changing the direction of the current to be passed to the drive line. In addition, the reflection surface can be deformed into various shapes by changing the drive line to which the current is to be supplied. Additionally, since the mirror structure does not have a hollow portion, the shape variable mirror can be easily manufactured by using the semiconductor micro-fabrication technology. Since the drive line selection circuit is included in the mirror structure, the entire structure of the shape variable mirror can be minimized.

This embodiment can be modified in many ways without departing from the scope of the present invention.

For example, as a constituent material of the elastically deformable insulation film 620, the polyimide films 622 and 624 may be substituted by any other resin material, a silicon oxide film or a silicon nitride film. Further, in order to detect a deformation amount of the reflection surface, a piezoresistance element or the like may be provided on the surface or to the inside of the reflection surface.

A current control circuit that controls the greatness of the current flowing through the drive line may be provided in place of the drive line selection circuits 618. Alternatively, in addition to the drive line selection circuits 618, a current control circuit that controls the greatness of the current flowing through the drive line may be provided. In other words, the drive line selection circuit 618 may have a function to control the greatness of the current flowing through the drive line.

Although many drive line selection circuits 618 comprise thin film pieces that are dotted about, a silicon thin film that the drive line selection circuits are built in may be formed over the entire area of the polyimide film when such thin film pieces deteriorate the performance of the reflection surface. That is, many drive line selection circuits 618 may be formed inside one silicon thin film formed over the entire central portion 650 of the insulation film 620.

The permanent magnets 642 may be fixed to the yoke as similar to FIG. 17. A number of the connection portions 654 is not restricted to four, it may be changed to three or two.

Although the above has described the embodiments according to the present invention with reference to the drawings, the present invention is not restricted to these embodiments, and various modifications or changes may be carried out without departing from the scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A movable structure comprising:
   a movable body;
   at least a pair of elastic members extending from the movable body to both sides; and
   a support supporting the movable body through the elastic members, each of the elastic members having a mesh structure, and the support and the movable body being connected to each other through the elastic members;

wherein the elastic members are capable of elastically deforming such that the movable body is moved.

2. The movable structure according to claim 1, wherein the support and the movable body are made from a silicon substrate.

3. The movable structure according to claim 1, wherein the elastic member is made of an organic insulation material.

4. The movable structure according to claim 1, wherein the movable body is made from a deformable elastic film.

5. The movable structure according to claim 4, wherein the movable body is partially directly connected to the support.

6. A deflection mirror element comprising:
a movable structure according to claim 1;
a reflection surface, which is formed on the movable body, reflecting a light beam; and
a driver changing a direction of the movable body, a direction of the light beam reflected by the reflection surface being varied in accordance with a change in direction of the movable body.

7. An optical switch element comprising:
a movable structure according to claim 1;
a mirror, which is fixed to the movable body, reflecting a light beam; and
a driver moving the movable body, a direction of the light beam being switched in response to the insertion and withdrawal of the mirror with respect to an optical path of the light beam by movement of the movable body.

8. A shape variable mirror comprising:
a movable structure according to claim 4;
a reflection surface formed on the movable body; and
a driver deforming the movable body, a shape of the reflection surface being changed by deformation of the movable body.

9. The shape variable mirror according to claim 8, wherein the driver includes a drive line mounted on the movable body and magnetic field generator generating a magnetic field traversing the drive line, and the reflection surface is deformed in accordance with elastic deformation of the movable body caused by the interaction between a current flowing through the drive line and the magnetic field.

10. The shape variable mirror according to claim 9, wherein the drive line is extending along a contour of the movable body, and the magnetic field includes a component radially traversing the drive line in substantially parallel to the surface of the movable body.

11. The shape variable mirror according to claim 9, wherein the drive line extends straightforward, and the magnetic field includes a component orthogonally traversing the drive line in substantially parallel to the surface of the movable body.

12. The shape variable mirror according to claim 8, wherein the driver includes drive lines mounted on the movable body and magnetic field generator generating a magnetic field traversing the drive lines, the drive lines extending straightforward in parallel to each other and being aligned along an axis orthogonal to a longitudinal axis thereof, such that the drive lines are one-dimensionally arranged along the axis orthogonal to the longitudinal axis thereof.

13. The shape variable mirror according to claim 12, wherein the driver further includes a selection circuit selecting a drive line to which a current is supplied from the one-dimensionally-arranged drive lines, and wirings electrically connecting the drive line and the selection circuit with an external current supply source, a shape of the reflection surface being one-dimensionally varied in accordance with a change in selection of the drive line to which the current is supplied by the selection circuit.

14. The shape variable mirror according to claim 8, wherein the driver includes drive lines mounted on the movable body and magnetic field generator generating a magnetic field traversing the drive lines, the drive lines constitute drive line groups, drive lines in the drive line groups extend straightforward in parallel to each other and aligned along an axis orthogonal to a longitudinal axis thereof, the drive line groups are aligned along the longitudinal axis of the drive lines, such that the drive lines are two-dimensionally arranged along the longitudinal axis thereof and the axis orthogonal to the longitudinal axis.

15. The shape variable mirror according to claim 14, wherein the driver further includes selection circuits selecting a drive line to which a current is supplied from the two-dimensionally-arranged drive lines, and wirings electrically connecting the drive line and the selection circuit with an external current supply source, a shape of the reflection surface being two-dimensionally varied in accordance with a change in selection of the drive line to which a current is supplied by the selection circuit.

* * * * *